US011016485B2

(12) United States Patent
Pedersen et al.

(10) Patent No.: US 11,016,485 B2
(45) Date of Patent: May 25, 2021

(54) TELEOPERATION FOR EXCEPTION HANDLING

(71) Applicants: Nissan North America, Inc., Franklin, TN (US); Renault S.A.S., Boulogne-Billancourt (FR)

(72) Inventors: Liam Pedersen, San Francisco, CA (US); Ali Mortazavi, Walnut Creek, CA (US); Stefan Witwicki, San Carlos, CA (US); Christopher Ostafew, Mountain View, CA (US)

(73) Assignees: Nissan North America, Inc., Franklin, TN (US); Renault S.A.S., Boulogne-Billancourt (FR)

( * ) Notice: Subject to any disclaimer, the term of this patent is extended or adjusted under 35 U.S.C. 154(b) by 67 days.

(21) Appl. No.: 16/367,758

(22) Filed: Mar. 28, 2019

(65) Prior Publication Data
US 2020/0310417 A1 Oct. 1, 2020

(51) Int. Cl.
G05D 1/00 (2006.01)
G05D 1/02 (2020.01)

(52) U.S. Cl.
CPC ......... *G05D 1/0061* (2013.01); *G05D 1/0088* (2013.01); *G05D 1/0214* (2013.01); *G05D 2201/0213* (2013.01)

(58) Field of Classification Search
CPC .. G05D 1/0061; G05D 1/0088; G05D 1/0214; G05D 2201/0213
See application file for complete search history.

(56) References Cited

U.S. PATENT DOCUMENTS

| 9,310,802 | B1 | 4/2016 | Elkins et al. | |
| 10,031,520 | B2 | 7/2018 | Rodas | |
| 10,168,674 | B1 | 1/2019 | Buerger et al. | |
| 10,649,453 | B1* | 5/2020 | Svegliato | B60W 50/029 |
| 2002/0023164 | A1 | 2/2002 | Lahr | |
| 2015/0039157 | A1 | 2/2015 | Wolfe et al. | |
| 2015/0248131 | A1 | 9/2015 | Fairfield et al. | |
| 2016/0311423 | A1 | 10/2016 | Storm | |
| 2016/0334230 | A1 | 11/2016 | Ross et al. | |

(Continued)

FOREIGN PATENT DOCUMENTS

| JP | 2008-076310 A | 4/2008 |
| JP | 2013-196632 A | 9/2013 |

(Continued)

OTHER PUBLICATIONS

Fong, T. et al. Vehicle teleoperation interfaces. Autonomous robots, 2001, 11(1), pp. 9-18.

(Continued)

Primary Examiner — Anne Marie Antonucci
Assistant Examiner — Sahar Motazedi
(74) Attorney, Agent, or Firm — Young Basile Hanlon & MacFarlane, P.C.

(57) ABSTRACT

Exception handing, such as of obstruction situations, by an autonomous vehicle (AV) is disclosed. A method includes identifying an exception situation; identifying a risk associated with autonomously resolving the exception situation; and in response to the risk exceeding a risk threshold, initiating a request for assistance from a tele-operator, and halting for the tele-operator to respond to the request; and receiving a response from the tele-operator.

20 Claims, 9 Drawing Sheets

(56) References Cited

U.S. PATENT DOCUMENTS

| | | | |
|---|---|---|---|
| 2017/0123419 | A1 | 5/2017 | Levinson et al. |
| 2017/0270802 | A1 | 9/2017 | Vignati et al. |
| 2018/0082494 | A1 | 3/2018 | Rech et al. |
| 2018/0105175 | A1 | 4/2018 | Muller et al. |
| 2018/0136651 | A1 | 5/2018 | Levinson et al. |
| 2019/0187691 | A1 | 6/2019 | Magzimof et al. |
| 2019/0270408 | A1* | 9/2019 | Castro ..................... B60Q 9/00 |

FOREIGN PATENT DOCUMENTS

| | | |
|---|---|---|
| JP | 2015-509195 A | 3/2015 |
| JP | 2016-095851 A | 5/2016 |
| JP | 5957744 B1 | 7/2016 |
| JP | 5957745 B1 | 7/2016 |
| WO | 2013/128920 A1 | 9/2013 |

OTHER PUBLICATIONS

Rothgeb, M., Intelligent autonomy for reducing operator workload. State College, PA: The Pennsylvania State University Applied Research Laboratory. 2007.
European Search Report from corresponding application EP 17876896.6, dated Nov. 4, 2019; 9 page.
Davies; Nissan's Path to Self-Driving Cars: Humans in Call Centers: Wired; Jan. 5, 2017; Retrieved Feb. 19, 2020; https://www.wired.com/2017/01/nissans-self-driving-teleoperation/.

* cited by examiner

TELEOPERATION FOR EXCEPTION HANDLING

TECHNICAL FIELD

This application generally relates to autonomous vehicles and more particularly to tele-operation assistance in obstruction situations.

BACKGROUND

Autonomous vehicles (AVs) offer human drivers the convenience of efficient conveyance from one location to another without having to direct their attention to the state of the road. An AV can be defined as a self-driven (e.g., computer controlled) vehicle that is capable of driving on roadways while obeying traffic rules and norms. However, even the best autonomous vehicle programming cannot account for, and control, all conditions and situations that can arise during operation of the autonomous vehicle. Furthermore, there are times when the autonomous vehicle encounters conditions and situations that might benefit from the assistance of a human operator (e.g., a tele-operator).

SUMMARY

Disclosed herein are aspects, features, elements, implementations, and implementations for generation of solutions associated with autonomous operation of vehicles.

An aspect of the disclosed implementations includes a method of exception handling by an autonomous vehicle (AV), the method includes identifying an exception situation; identifying a risk associated with autonomously resolving the exception situation; and in response to the risk exceeding a risk threshold, initiating a request for assistance from a tele-operator, and halting for the tele-operator to respond to the request; and receiving a response from the tele-operator.

An aspect of the disclosed implementations includes a method of exception handling by an autonomous vehicle (AV), the method includes identifying a lane-obstruction situation; identifying a first trajectory for avoiding the lane-obstruction situation; and, in response to identifying, based on the first trajectory, that the lane-obstruction situation is an exception situation: determining a risk associated with the first trajectory; and, in response to determining that the risk exceeds a risk threshold, initiating a request to a tele-operator, wherein the request includes the first trajectory, and waiting for a response from the tele-operator.

An aspect of the disclosed implementations includes an apparatus including a memory and a processor. The memory includes instructions for exception handling by an autonomous vehicle (AV). The processor is configured to execute the instructions to identify an exception situation; identify a risk associated with autonomously resolving the exception situation; and, in response to the risk exceeding a risk threshold, initiate a request to a tele-operator; wait for the tele-operator to respond to the request; and receive a response from the tele-operator.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
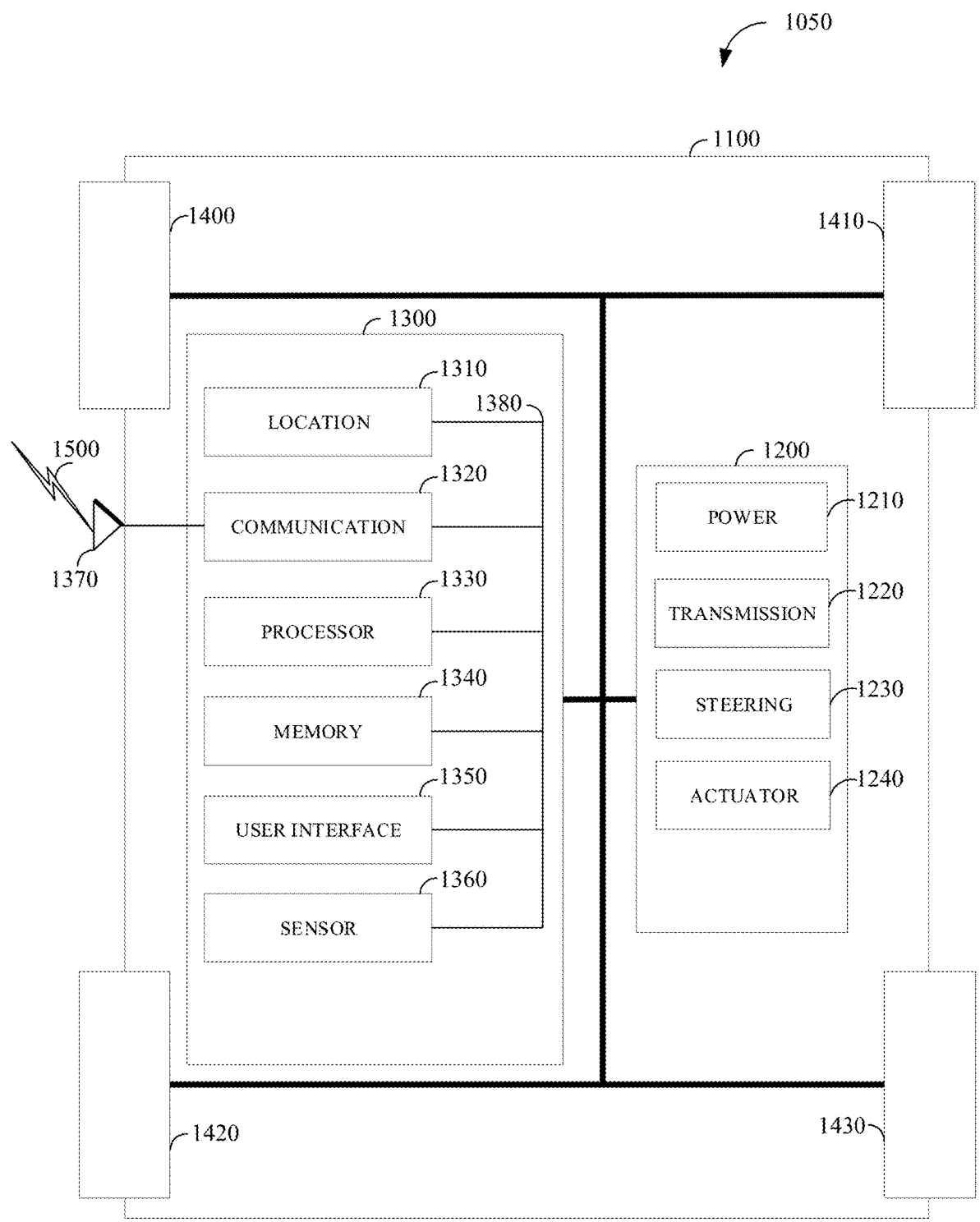
FIG. 1 is a diagram of an example of a portion of a vehicle in which the aspects, features, and elements disclosed herein may be implemented.

An autonomously driven vehicle (AV) may be unable to cope with many road situations. Some situations may be outside the programming of the AV. For example, the AV may not be able to fully assess, classify, and/or understand the intentions of other road users. The other road users can include pedestrians, construction workers, policemen, construction equipment, vehicles, cyclists, or other static objects (e.g., buildings, road signs, etc.). For example, assessing the road situation may be outside the sensing capabilities of the AV, such as in the case of identifying whether other road users are present around a corner that is obstructed by a building or whether other road users are present on the other side of a hill. Furthermore, resolving some other situations (e.g., obstruction situations) may require the AV to deviate from the normal (e.g., legal, socially acceptable) rules of driving in a manner that is unacceptable without human oversight. Road situations, with which an AV is unable to cope, are referred to herein as exception situations. An exception situation is a driving situation that requires that the AV suspend some driving norms in order to make forward progress (such as toward a final destination of the AV).

When the AV encounters an exception situation, the AV can stop and request assistance from a tele-operator. For example, when the AV encounters an obstruction (e.g., a construction site, a stopped vehicle, etc.) in a roadway, the AV might not go around the obstruction if doing so means that the AV will travel through an area that is physically safe but is restricted by traffic regulations. Accordingly, a tele-operator (e.g., a human operator, a vehicle manager) can be tasked with assisting the AV in negotiating its problematic situation by, for example, mapping a path (i.e., a trajectory) for the AV around the obstruction. The tele-operator may be one of many tele-operators that are available at a tele-operation center (i.e., a remote vehicle assistance center) where each tele-operator can monitor the state or condition of one or more AVs.

However, a stopped AV (such as in the middle of a road) can present a public nuisance or result in dangerous and unsafe road conditions. As such, even when tele-operator assistance is requested and/or provided, the tele-operators must respond to a request for assistance quickly.

In an experiment, during a three-hour drive in the San Francisco area, an AV encountered 19 exception situations that required resolution by a tele-operator. On average, it took the tele-operator one minute per exception situation to assess the exception situation (such as based on information received from the AV) and map a path for the AV. As such, on average, 11% (i.e., 360 minutes/19 minutes~11%) of the day is spent resolving exception situations for one AV. In San Francisco, 450,000 vehicles are registered to provide taxi services. It is expected that in the not-too-distant future, taxi service can be provided only by autonomous vehicles. As such, and assuming that one tele-operator can be dedicated to managing 10 AVs, in the city of San Francisco alone, 450 tele-operators will be required. Such a model (i.e., a model that heavily depends on human intervention) is not practical, sustainable, profitable, or efficient.

In the description above, upon encountering an exception situation, an AV stops and requests tele-operator assistance. The tele-operator assistance model may require many tele-operators and a significant amount of time to resolve each exception situation.

Implementations according to this disclosure can reduce the need for tele-operation support (e.g., intervention). The need for tele-operation support can be reduced by reducing the time that is required by a tele-operator to resolve (e.g., respond to) an exception situation. The need for tele-operation support can be reduced by reducing the number of exception situations that require tele-operator support, such as by a trajectory for an AV.

When an AV encounters an obstruction situation, the AV can classify the obstruction situation into a normal situation or an exception situation. If the obstruction situation is classified as a normal situation, the AV can autonomously negotiate (e.g., go around) the obstruction situation. If, on the other hand, the obstruction situation is classified as an exception situation, the AV can determine (e.g., select, calculate, map, etc.) a trajectory (i.e., a path) around the exception situation and determine a risk for the path. In some situations, the trajectory around the exception situation can merely be that the AV comes to complete stop until the exception situation has resolved itself.

The risk can be numerical number (such as a percent, a number between 0 and 1, a number between 0 and 10, or some other number). In another example, the risk can be an ordinal label (such, as "normal," "low," or "high" "green," "yellow," or "red;" etc.). If the risk is below a risk threshold (e.g., less than "high," less than 75%), then the AV can autonomously proceed along the path. On the other hand, if the risk is not below the risk threshold, the AV can issue a request to a tele-operator. The request can include the path. The tele-operator can merely approve the path. As such, if the AV receives approval of the path, the AV can autonomously proceed along the path.

In an implementation, the systems and techniques disclosed herein can be summarized as follows. As an AV is driving autonomously without human supervision, the AV may encounter an obstruction. The obstruction can be a new object, which can be another road user, a static object, or another object. For example, the obstruction can be a leading vehicle (i.e., a vehicle that is driving in front of the AV) that has come to a stop. In response to the obstruction, the AV determine a path around the obstruction. If no path is possible, then the AV can come to a halt and wait for the obstruction to clear. This is referred herein as the wait response. If a path is possible, the AV can evaluate a risk associated with autonomously going around the obstruction using the path. Based on the risk, the AV can perform a response whereby the AV can, if the risk is less than a risk threshold, (a) autonomously go around the obstruction in normal manner; or if the risk is not less than the risk threshold, (b) contact a tele-operator for assistance. For ease of reference, the responses (a)-(b) can be referred to, respectively, as a normal response, and an assistance response. As such, the possible responses of the AV to an obstruction can include a wait response, a normal response, and an assistance response.

In the case of a wait response, the AV comes to a complete stop and can re-evaluate the situation over time. Depending on how the situation changes over time, the AV can either continue to wait, autonomy go around the obstruction, or contact a tele-operator. In an example, if the obstruction situation does not resolve itself within a predefined period of time, the AV can perform an assistance response. In an example, the obstruction situation may change such that the AV can perform either a normal response or an assistance response.

The AV may be programmed to remain in a single lane (e.g., single-lane constraint). However, when encountering an obstruction, the AV can relax (e.g., release) the single-lane constraint and autonomously go around the obstruction, when permitted by a gap in other traffic. If no gap in traffic exists, the AV comes to a halt and waits, or remains waiting, until the situation changes (e.g., the obstruction clears, a gap in traffic, etc.).

In the case of an assistance response (i.e., the AV contacts a tele-operator for assistance), the AV contacts a tele-operation center for assistance and comes to a controlled halt behind the obstruction while waiting for a response from a tele-operator at the tele-operation center.

The request for assistance can include an AV-suggested action. In an example, the AV-suggested action can be to go around the obstruction using a trajectory (e.g., a path) that is mapped by the AV. In an example, the trajectory can be a new route to a destination of the AV. The trajectory that is mapped by the AV can be included in the request for assistance. The response from the tele-operator can be an authorization to the AV to perform the AV-suggested action, also referred to herein as a "proceed response" or a "response to proceed;" to continue to wait, also referred to herein as a "wait response" or a "response to wait;" to go around the obstruction using a trajectory that is provided by the tele-operator, also referred to herein as a "trajectory response" or a "response that includes a trajectory"; or some other response. If the tele-operator approves the AV-suggested action of going around the obstruction, the AV may temporarily allow itself into an opposite-traffic lane and continue around the obstruction autonomously.

In an implementation, the assistance response can be in the form of an issuance by the AV of a ticket. The ticket can be assigned to a tele-operator at the tele-operation center. The ticket can be assigned to a specific tele-operator who may be selected based on expertise of the tele-operator, a geographical location of the AV, state information of the AV, information regarding the obstruction situation, or some other criteria. In another implementation, the ticket may be placed in a first-in-first-out queue and is assigned to a next available tele-operator.

In the above mentioned 19 exception situations, and using the techniques described herein, roughly 50% were determined to have a risk below the risk threshold. Accordingly, by autonomously (i.e., without tele-operator intervention) resolving such obstruction situations, the total tele-operation time can be reduced by 50%. Additionally, by reducing the tele-operator time needed, at least in some situations, to a mere approval of the AV-proposed path (i.e., the tele-operator only needs to approve an action most of the time, and does not need to closely direct the AV, such as by mapping a path for the AV), additional reduction in tele-operation time can be achieved. Accordingly, implementations according to this disclosure can reduce tele-operation time for a fleet of AVs. For example, the ratio of AVs to tele-operators required can be reduced from 10:1 to 40:1 (e.g., from 1 tele-operator for every 10 AVs to 1 tele-operator for every 40 AVs). As such, tele-operation costs for exception handling by be reduced by 75%.

To describe some implementations in greater detail, reference is made to the following figures.

FIG. 1 is a diagram of an example of a vehicle 1050 in which the aspects, features, and elements disclosed herein may be implemented. The vehicle 1050 includes a chassis 1100, a powertrain 1200, a controller 1300, wheels 1400/1410/1420/1430, or any other element or combination of elements of a vehicle. Although the vehicle 1050 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1050, which can include accelerating, decelerating, steering, or otherwise controlling the vehicle 1050.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1050.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some embodiments, the processor 1330 may be configured to execute instructions including instructions for remote operation which may be used to operate the vehicle 1050 from a remote location including the operations center. The instructions for remote operation may be stored in the vehicle 1050 or received from an external source such as a traffic management center, or server computing devices, which may include cloud-based server computing devices. The processor 1330 may be configured to execute instructions for exception handling as described herein.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short-range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1050. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1050, a current position of the vehicle 1050 in two or three dimensions, a current angular orientation of the vehicle 1050, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1050.

In some embodiments, the sensor 1360 may include sensors that are operable to obtain information regarding the physical environment surrounding the vehicle 1050. For example, one or more sensors detect road geometry and obstacles, such as fixed obstacles, vehicles, cyclists, and pedestrians. In some embodiments, the sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensor 1360 and the location unit 1310 are combined.

Although not shown separately, the vehicle 1050 may include a trajectory controller. For example, the controller 1300 may include a trajectory controller. The trajectory controller may be operable to obtain information describing a current state of the vehicle 1050 and a route planned for the vehicle 1050, and, based on this information, to determine and optimize a trajectory for the vehicle 1050. In some embodiments, the trajectory controller outputs signals operable to control the vehicle 1050 such that the vehicle 1050 follows the trajectory that is determined by the trajectory controller. For example, the output of the trajectory controller can be an optimized trajectory that may be supplied to the powertrain 1200, the wheels 1400/1410/1420/1430, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1050 under control of the transmission 1220, or a steered and propelled wheel that steers and propels the vehicle 1050.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
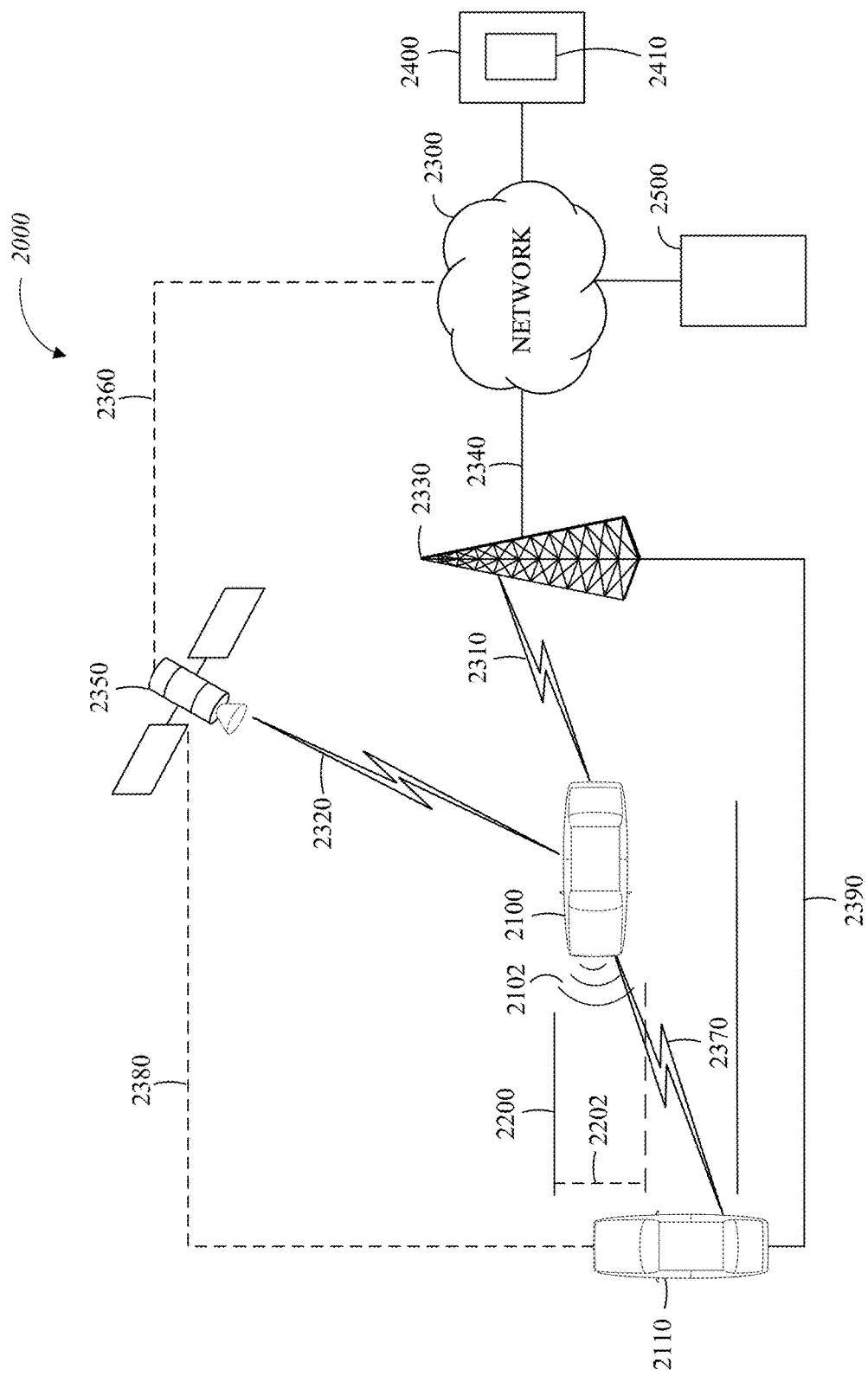
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1050 shown in FIG. 1, and one or more external objects, such as an external object 2110, which can include any form of transportation, such as the vehicle 1050 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may tele-operate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350. The operations center 2400 may include one or more computing devices, which are able to exchange (send or receive) data from: vehicles such as the vehicle 2100; external objects including the external object 2110; or computing devices such as the server computing device 2500.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

Figure 3:
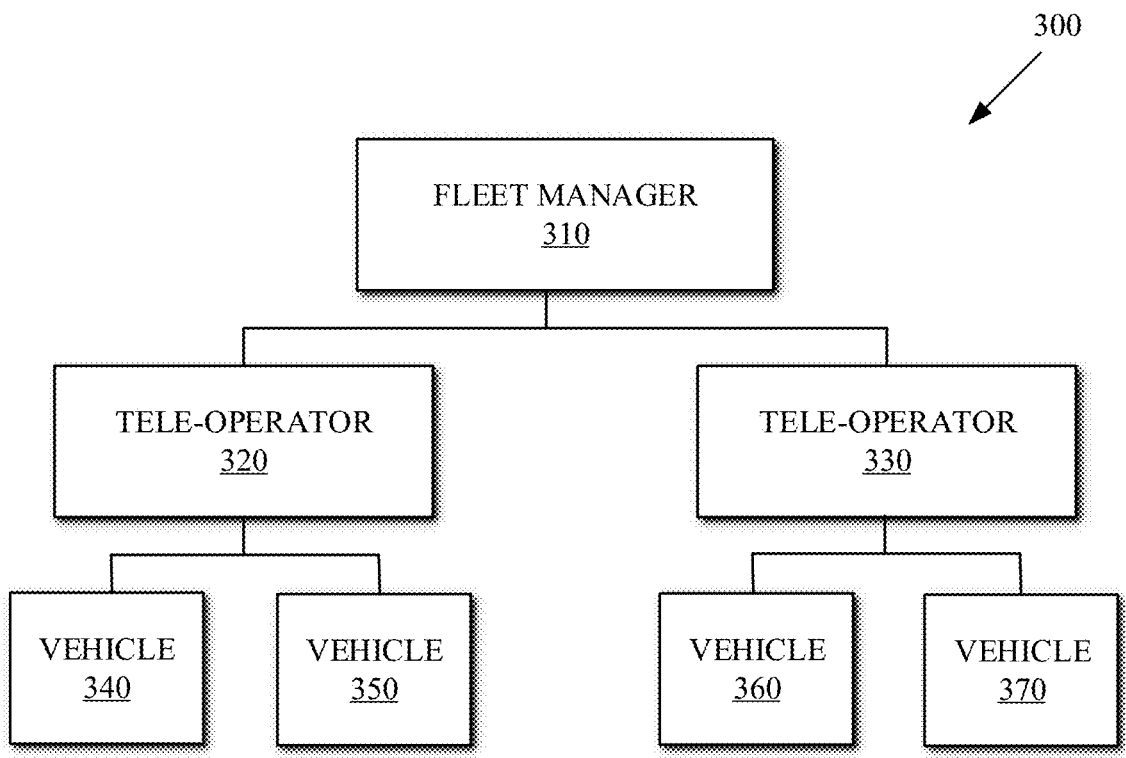
FIG. 3 is a block diagram illustrating a remote vehicle assistance center according to implementations of this disclosure.

FIG. 3 is a block diagram illustrating a remote vehicle assistance center 300 according to implementations of this disclosure. The remote vehicle assistance center 300 can also be referred to as a remote system or a tele-operations center. The remote vehicle assistance center 300 includes a fleet manager 310, a plurality of vehicle managers (i.e., tele-operators) including but not limited to a tele-operator 320 and a tele-operator 330, and a plurality of vehicles including but not limited to vehicles 340, 350, 360, and 370.

The fleet manager 310 can include an apparatus including some or all of the features of the controller 1300 shown in FIG. 1 or the controller apparatus 2410 of FIG. 2. The fleet manager 310 can monitor and coordinate tele-operators, including the tele-operators 320/330 as well as the movement of vehicles, including autonomous vehicles, and the vehicles 340/350/360/370. Monitoring and coordinating the tele-operators can include any of: assigning, allocating, or deallocating, vehicles to the tele-operators; reviewing and monitoring performance data of the tele-operators; and assigning tele-operators to a geographic area. In an implementation, there can be multiple fleet managers, who may in turn be managed or under the authority of other fleet managers.

The tele-operator 320 can monitor the state or condition of vehicles, including the vehicle 340 and the vehicle 350. As illustrated in FIG. 3, the tele-operator 320 has been assigned vehicle 340 and vehicle 350. The assignment of vehicles to a tele-operator can be performed by a fleet manager such as the fleet manager 310.

The tele-operator 330 can monitor the state or condition of vehicles, including the vehicle 360 and the vehicle 370. As illustrated in FIG. 3, the tele-operator 330 has been assigned vehicle 360 and vehicle 370. The assignment of vehicles to a tele-operator can be performed by a fleet manager such as the fleet manager 310. The assignment of vehicles to a tele-operator can also be automated using machine learning techniques.

In an implementation, the tele-operators can cluster or group the vehicles, establish communication with occupants in the vehicle, remotely operate the vehicles, and coordinate the movement of the vehicles through a transportation network or around various obstacles such as traffic congestion. The tele-operators can interact with other tele-operators to aid in the monitoring and management of the vehicles.

The vehicles including the vehicle 340/350/360/370 comprise vehicles such as the vehicle 2100 as shown in FIG. 2, that are being monitored or coordinated by the fleet manager 310. The vehicles can be operated autonomously or by a human driver and can exchange (send and receive) vehicle data relating to the state or condition of the vehicle and its surroundings including any of: vehicle velocity; vehicle location; vehicle operational state; vehicle destination; vehicle route; vehicle sensor data; external object velocity; and external object location.

In the description herein, sentences describing the autonomous vehicle as taking an action (such as performing, determining, initiating, receiving, calculating, deciding, etc.) are to be understood that some appropriate module of the AV as taking the action. Such modules may be stored in a memory of the AV, such as the memory 1340 of FIG. 1, and executed by a processor, such as the processor 1330 of FIG. 1. Such modules may be partially or fully included in a controller apparatus, such as the controller apparatus 2410 of FIG. 2 and may be partially or fully executed by a processor of the AV, a processor of an operations center, or a combination thereof. For example, the statement "the AV determines a trajectory" can be understood to mean that "a module of the AV determines a trajectory" or "a trajectory planning module of the AV determines a trajectory."

Figure 4:
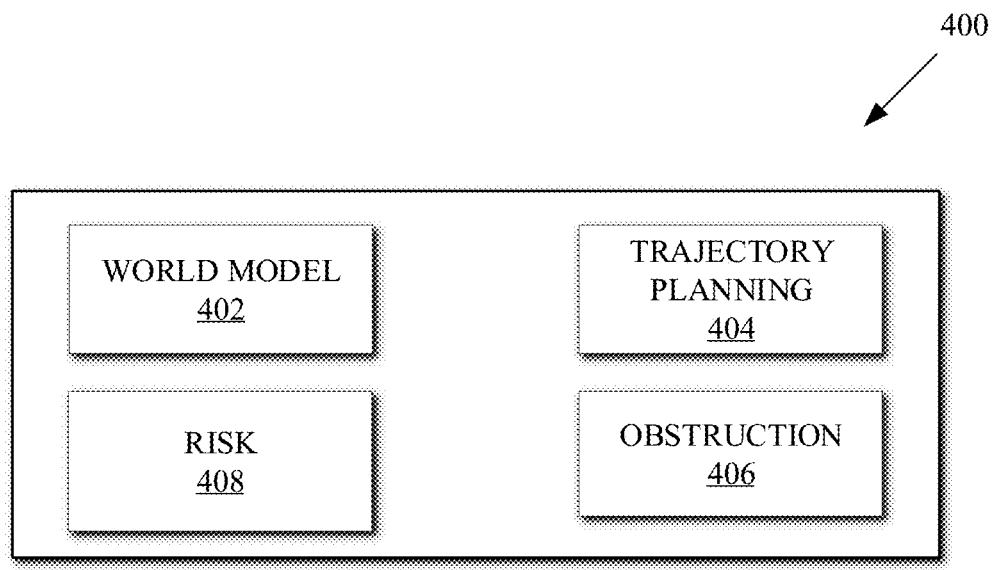
FIG. 4 is an example of modules of a system for exception handling according to implementations of this disclosure.

FIG. 4 is an example of modules of a system 400 for exception handling according to implementations of this disclosure. The system 400 can be included in a vehicle (e.g., an autonomous vehicle) including the vehicle 1050 shown in FIG. 1, the vehicle 2100 shown in FIG. 2, one of the vehicles 340/350/360/370 of FIG. 3. The system 400 can be stored in a memory, such as the memory 1340 of FIG. 1, as computer executable instructions that can be executed by a processor, such as the processor 1330 of FIG. 1.

The system 400 includes a world model module 402, a trajectory planning module 404, an obstruction manager module 406, and a risk evaluation module 408. Other examples of the system 400 can include more, fewer, or other modules. In some examples, some of the modules can be combined; in other examples, a module can be divided into one or more other modules. For example, the risk evaluation module 408 may be combined with the obstruction manager module 406. The modules, or a subset therefrom, of the system 400 can be referred to as an exception handling module.

The world model module 402 can receive sensor data, such as from the sensor 126 of FIG. 1, and determines (e.g., converts to, detects, etc.) objects from the sensor data. That is, for example, the world model module 402 can determine the road users (e.g., one or more external objects or external object 2110, as described with respect to FIG. 2) from the received sensor data. For example, the world model module 402 can convert a point cloud received from a light detection and ranging (LiDAR) sensor (i.e., a sensor of the sensor 126) into an object. Sensor data from several sensors can be fused together to determine (e.g., guess the identities of) the objects. Examples of objects include a bicycle, a pedestrian, a vehicle, a structure, etc. The objects maintained by the world model module 402 can include static objects and/or dynamic objects. A dynamic object is a world object that is currently moving. A static object can be any non-moving object. A building or a traffic sign can be examples of static objects. A static object can be an object that was previously classified as a dynamic object; or vise versa.

The world model module 402 can receive sensor information that allows the world model module 402 to calculate and maintain additional information for at least some of the detected objects. For example, the world model module 402 can maintain a state for at least some of the determined objects. For example, the state for an object can include zero or more of a velocity, a pose, a geometry (such as width, height, and depth), a classification (e.g., bicycle, large truck, pedestrian, road sign, etc.), and a location. As such, the state of an object includes discrete state information (e.g., classification) and continuous state information (e.g., pose and velocity).

The world model module 402 can fuse sensor information, can track objects, can maintain lists of hypotheses for at least some of the dynamic objects (e.g., an object A might be going straight, turning right, or turning left), can create and maintain predicted trajectories for each hypothesis, and can maintain likelihood estimates of each hypothesis (e.g., there is a 90% probability that object A will go straight, considering object A's pose/velocity and the trajectory poses/velocities).

In an example, the world model module 402 uses one or more instances of the trajectory planning module 404 to generate the predicted trajectories for each object hypothesis for at least some of the dynamic objects. For example, an instance of the trajectory planner can be used to generate predicted trajectories for vehicles, bicycles, and pedestrians. In another example, an instance of the trajectory planner can be used to generate predicted trajectories for vehicles and bicycles, and a different method can be used to generate predicted trajectories for pedestrians.

The trajectory planning module 404 can generate a trajectory (i.e., a path) of a vehicle by detecting (e.g., sensing, observing, etc.) the presence of static objects and anticipating (i.e., predicting) the trajectories of other users (e.g., road users, dynamic objects) of the vehicle transportation network. The trajectory planning module 404 can generate a trajectory for the AV, from a source location to a destination location, by, for example, receiving map data, teleoperation data, and other input data; stitching (e.g., fusing, connecting, etc.) the input data longitudinally to determine a speed profile for a path from the source location to the destination location (e.g., the speed profile specifying how fast the AV can be driven along different segments of the path from the source location to the destination location); and, at discrete time points (e.g., every few milliseconds), having the trajectory planner process constraints related to static and dynamic objects, which are observed based on sensor data of the AV, to generate a smooth trajectory for the AV for the next time window (e.g., a look-ahead time of 6 seconds).

The trajectory planning module 404 can determine a next-few-seconds trajectory. As such, and in an example where the next few seconds are the next 6 seconds (i.e., a look-ahead time of 6 seconds), the trajectory planning module 404 can determine a trajectory and locations for the AV in the next 6 seconds. For example, the trajectory planning module 404 may determine (e.g., predict, calculate, etc.) the expected locations of the AV at several time intervals (e.g., every one-quarter of a second, or some other time intervals). The trajectory planning module 404 can determine the detailed-planned trajectory based on predictable responses of other road users.

In an example, the world model module 402 can use an instance of the trajectory planning module 404 to generate the predicted trajectories for each object hypothesis for at least some of the dynamic objects. For example, an instance of the trajectory planning module 404 can be used to generate predicted trajectories for vehicles, bicycles, and pedestrians. In another example, an instance of the trajectory planning module 404 can be used to generate predicted trajectories for vehicles and bicycles, and a different method can be used to generate predicted trajectories for pedestrians.

The trajectory planning module 404 can receive the anticipated (i.e., predicted) trajectories of other users of the vehicle transportation network (also referred to as real-world objects) from the world model module 402. For each detected dynamic object (e.g., a real-world object, such as a vehicle, a pedestrian, a bicycle, and the like), the world model module can maintain (e.g., predict and update) one or more hypothesis regarding the possible intentions of the real-world object. Examples of intentions (e.g., hypotheses) include stop, turn right, turn left, go straight, pass, and park. A likelihood is associated with each hypothesis. The likelihood is updated based on observations received from sensor data.

In an example, to determine a path for the next time window (such as to go around an obstruction), the trajectory planning module 404 can determine a drivable area and a discrete-time speed plan for the next time window. The drivable area can be, for example, the area of a vehicle transportation network where the AV can be driven. Initially, the drivable area may include areas where the AV cannot be predicted to be safely driven. The trajectory planning module 404 cuts out of the drivable area those areas where the AV cannot be predicted to be safely driven. This process results in an adjusted drivable area. The adjusted drivable area can include areas that violate traffic norms.

The trajectory planning module 404 can identify nearby objects to the AV. In an example, the nearby objects can be at least some of the external objects maintained by the world model module 402. For example, the nearby objects can be objects within a predetermined distance from the AV, objects within a predicted arrival time of the AV, or objects that meet other criteria for identifying a subset of the objects, such as objects that constitute the obstruction situation.

The trajectory planning module 404 determines an adjusted drivable area. The "adjusted drivable area" is the drivable area after areas have been removed from the drivable area to account for static and/or dynamic objects. For example, in determining the adjusted drivable area, the trajectory planning module 404 can consider any objects that caused the obstruction situation, oncoming vehicle, and other road objects that may be in the proximity (coming from behind, on the left, on the right, etc.) of the AV.

The trajectory planning module 404 adjusts the drivable area for static objects. That is, the trajectory planning module 404 removes (e.g., cuts out, etc.) from the drivable area those portions of the drivable area where static objects are located. This is so because the AV is to be controlled to navigate (e.g., drive) around the static objects. It is noted that an object that is currently classified as static object may have been classified as a dynamic object at a previous time instant and may become a dynamic object at a future time instant. The size of the cut-out area can be determined based on an estimate of the size of the static object. The size of the cut-out area can include a clearance area so that the AV does not drive too close to the static object.

The trajectory planning module 404 can adjust the discrete-time speed plan for static objects. For example, in the absence of obstacles or other road users, the discrete-time speed plan can follow a predetermined speed profile. For example, when the adjusted drivable area contains a narrow pass, accounting for static objects, instead of following (i.e., using the speed of) the strategic profile verbatim (i.e., as set in the strategic profile), the trajectory planning module 404 adjusts the discrete-time speed plan to reduce the speed of the AV to a comfortable speed. For example, when the adjusted drivable area, accounting for static objects, contains a static blockage (e.g., an obstruction situation), the trajectory planning module 404 adjusts the discrete-time speed plan such that the AV comes to a stop a prescribed distance before the static blockage.

The trajectory planning module 404 can then adjust the drivable area for dynamic objects. That is, the trajectory planning module 404 cuts out portions of the drivable area based on the respective predicted trajectories of each of the dynamic objects. The trajectory planning module 404 can use timing information regarding locations of each of the dynamic objects to cut out additional portions of the drivable area. The cutouts in the drivable area for dynamic objects are generated by comparing the timing of the predictions for the dynamic objects compared to the timing generated by the discrete-time speed plan, which now accounts for static objects. That is, the trajectory planning module 404 can predict for a dynamic object, and, based on the predicted trajectory of the dynamic object, where the dynamic object will be located at different discrete points in time relative to the locations of the AV at the same discrete points in time. The locations of a dynamic object are matched to the predicted locations of the AV to determine cutout portions.

The trajectory planning module 404 can then perform an optimization operation(s), such as a constrained operation, to determine an optimal trajectory for the AV. The trajectory planning module 404 can use (i.e., as inputs to the optimization operation) the motion model (e.g., the kinematic motion model) of the AV, a coarse driveline (e.g., a line in the road over which the longitudinal axis of the AV coincides as the AV moves along the road), and the adjusted drivable area, more, fewer, or other inputs to calculate (e.g., determine, generate, etc.) an optimal trajectory for the AV.

The obstruction manager module 406 can identify the obstruction situation. For example, if the obstruction manager module 406 detects that the trajectory (i.e., a first trajectory) of the AV, as determined by the trajectory planning module 404 is blocked, then after a predetermined period of time (e.g., a few seconds), the obstruction manager module 406 can cause the trajectory planning module 404 to generate a second trajectory by relaxing traffic norms. The first trajectory may have been generated without violating traffic norms. For example, in deriving the drivable area, the trajectory planning module 404 may have excluded opposite direction road lanes and/or off-road areas. In generating the second trajectory, the obstruction manager module 406 can direct the trajectory planning module 404 to use areas that the trajectory planning module 404 considered non-drivable areas when generating the first trajectory.

The obstruction manager module 406 can cause the risk evaluation module 408 to assess a risk associated with the obstruction situation, with the second trajectory, or a combination thereof. In the case that the risk associated with the second trajectory being greater than a risk threshold, the obstruction manager module 406 can initiate a request to a tele-operator, as further described below. The obstruction manager module 406 can receive a response from the tele-operator and cause the AV to be operated according to the response. As mentioned above, the response of the tele-operator can be a wait response, a proceed response, a response that includes a trajectory, or some other response, as further described below.

The risk evaluation module 408 determines a risk associated with the obstruction situation, with the trajectory, or a combination thereof. In a first example, the risk can be considered to be a measure of understanding by the AV (such as based on received sensor data, high definition (HD) map data, and other data that may be available to the AV) of the obstruction scene. For ease of reference, the measure of understanding by the AV of the obstruction scene can be referred to as a situation likelihood value, or simply a situation likelihood. In a second example, the risk can be a based on a weighting of the situation likelihood and the consequence(s) of following the second trajectory, which is generated by the trajectory planning module 404 as described above. Other ways of measuring risk are possible.

In the first example, the risk evaluation module 408 determines the risk based on values of features that can be important and/or relevant to resolving the exception situation. The features can include whether any other world objects are present in the scene, the state information of the other world objects, the location of the AV on an HD map, the speed of the AV, the visibility from the AV, specific features regarding stopped vehicles, fewer information, additional information, other information, or a combination thereof.

For example, features regarding other world objects can include whether there are any of vehicles, bicycles, pedestrians and their respective numbers, whether a world object was previously detected or is a new object, and/or whether a previously detected object was previously determined to be moving (e.g., whether the classification of the detected object has changed from dynamic to static). For example, prior observations that a vehicle was moving but is now stopped can indicate that the vehicle is likely to move again. The location of the AV on the HD map can include the type of road, the presence of traffic signs (e.g., traffic lights, stop signs, etc.), intersections, and the like. The visibility from the AV can include whether the view of the AV is blocked (such as by a stopped vehicle), the presence of a hill, and the like. Other features regarding stopped vehicles can include, to the extent that they are perceived and detected using sensor information, whether hazard lights are on, whether and which doors are open, whether pedestrians are loading or unloading, and the like. The determined risk value can be a weighted combination of the feature values.

The presence of pedestrians in the scene can increase the risk. An unobstructed view of the AV can lower the risk. Uncertainty (or degrees of uncertainty) regarding classification of objects can increase the risk. For example, while a vehicle may be parked, it may not be possible to determine whether the vehicle is permanently stopped (such as because it has broken down) or whether it is temporarily parked (such as at an intersection). A degree of certainty may be associated with whether an object is permanently stopped. Other indicia can be used in determining the risk of whether the vehicle is permanently or temporarily stopped. For example, detecting pylons and/or flashing hazard lights can increase the certainty that the vehicle is permanently stopped. For example, the longer the vehicle has been stopped, the higher the chances that is vehicle is permanently stopped. Bad (snowy, foggy, etc.) weather conditions can increase the risk. For example, that a vehicle is observed (e.g., determined, assessed, etc.), such as based on HD map data, to be stopped at an intersection can indicate that the vehicle is more likely to be yielding to other traffic. As such, the vehicle is likely to move again; unless it is observed to be stationary for a sustained time in excess of normal yield times at that intersection.

In an example, that a leading vehicle was previously determined to move (and therefore is highly likely to continue moving) can cause the AV to select a strategy to wait, rather than go around the vehicle. However, if the leading vehicle is not determined to have moved for a predetermined period of time (e.g., 2 minutes, 3 minutes, or some other stop time), then a risk associated with the second trajectory can be determined.

In the second example, and as mentioned above, the risk evaluation module 408 can determine the risk based on a weighting (e.g., a product) of the situation likelihood value and the consequences of following the second trajectory, which is generated by the trajectory planning module 404 as described above. The risk evaluation module 408 can be thought of as computing the risk of allowing the AV to go around the obstruction without remote human supervision. The risk can be a measure of the likelihood of an outcome weighted by the social cost of that outcome. Mathematically, given possible outcomes $\{Y_i\}$ (e.g., the obstruction moves while AV is going around it), with likelihoods $\{P_i\}$ and 'social cost' $\{C_i\}$, the risk can be computed as risk=max_i $\{P_i * C_i\}$.

For example, assume that a person is detected in the obstruction scene. A person in the scene (who is not a normal pedestrian crossing the road) elevates risk at least because i) it is unknown if that person is a legitimate traffic director (e.g. traffic policeman or construction worker) and ii) ignoring, or ignoring the instructions of, a legitimate traffic director may have a high cost. If the person is in fact a policeman but is not so classified (such as by the world model module 402) with complete certainty, then the consequences of ignoring the policeman's instruction are high.

In the second example, the risk can be described as the risk of the AV making a decision (e.g., a decision to follow a trajectory) based on the AV's own understanding of the obstruction situation and without any further input (such as from a human tele-operator). Said another way, the computation of the risk is based on the selected action of the AV. The selected action of the AV is essentially the action to proceed according to the second trajectory. Said yet another way, the risk can be calculated based on the AV's understanding of the situation. A lack of knowledge (i.e., understanding) can imply that unwelcome outcomes (e.g., disobeying a traffic policeman) cannot be eliminated and therefore must be considered as possible.

The risk evaluation module 408 can estimate one or more situation likelihood values, each associated with combinations of possible feature values. The features in the scene can be used to inform of possible outcome likelihoods and costs. For example, if there is a clear view ahead and sufficient space, the cost of overtaking an obstruction that moves is likely low. For example, if the obstruction has hazard lights on, the likelihood of it moving is likely low as well. Consequently the risk is very (e.g., risk=low*low=(very low)). For example, if a person is identified in a scene, one situation likelihood value may be associated with the person being a policeman and a second situation likelihood value may be associated with the person being a construction worker. Additionally, whereas one second trajectory is described above, more than one second trajectory can be generated by the trajectory planning module 404 and consequences associated with each of the second trajectories evaluated. The final risk evaluation (e.g., the risk value provided by the risk evaluation module 408) can be the worst case risk associated with the set of considered outcomes. That, the risk can be the minimum (i.e., riskiest) of all the calculated risk values.

The product, as shown in Table I, of the situation likelihood value and a consequence value can be used as the risk value. In Table I, which is reminiscent of a Risk Assessment matrix, the situation likelihood value is shown as having three values (i.e., low, medium, high) and the consequence value is also shown as having three values (i.e., low, medium, high). However, as a person skilled in the art recognizes more or less values (labels or numerical values) can be assigned to situation likelihood value and/or the consequence value. In the case that numerical values are used, the risk can be determined as the multiplying the situation likelihood value by the consequence value. An example, of risk assessment matrix is shown in Table I.

TABLE I

|  |  | Situation Likelihood | | |
|---|---|---|---|---|
|  |  | Low | Medium | High |
| Consequence | High | Yellow | Red | Red |
|  | Medium | Green | Yellow | Red |
|  | Low | Green | Green | Yellow |

Table I illustrates that the risk is identified as "Green" in situations where the situation likelihood/consequence value combinations are determined to be Low/Medium, Low/Low, and Medium/Low; the risk is identified as "Yellow" in situations where the situation likelihood/consequence value combinations are determined to be Low/High, Medium/Medium, and High/Low; and the risk is identified as "Red" in situations where the situation likelihood/consequence value combinations are determined to be Medium/High, High/High, and High/Medium. In an example, in Green and Yellow risk situations, the AV can autonomously (i.e., without tele-operator intervention or aid) resolve (e.g., go around, deal with, navigate around, etc.) the obstructions situation. However, when the risk is Red, the AV (i.e., the obstruction manager module 406) initiates a request for assistance from a tele-operator.

Figure 5:
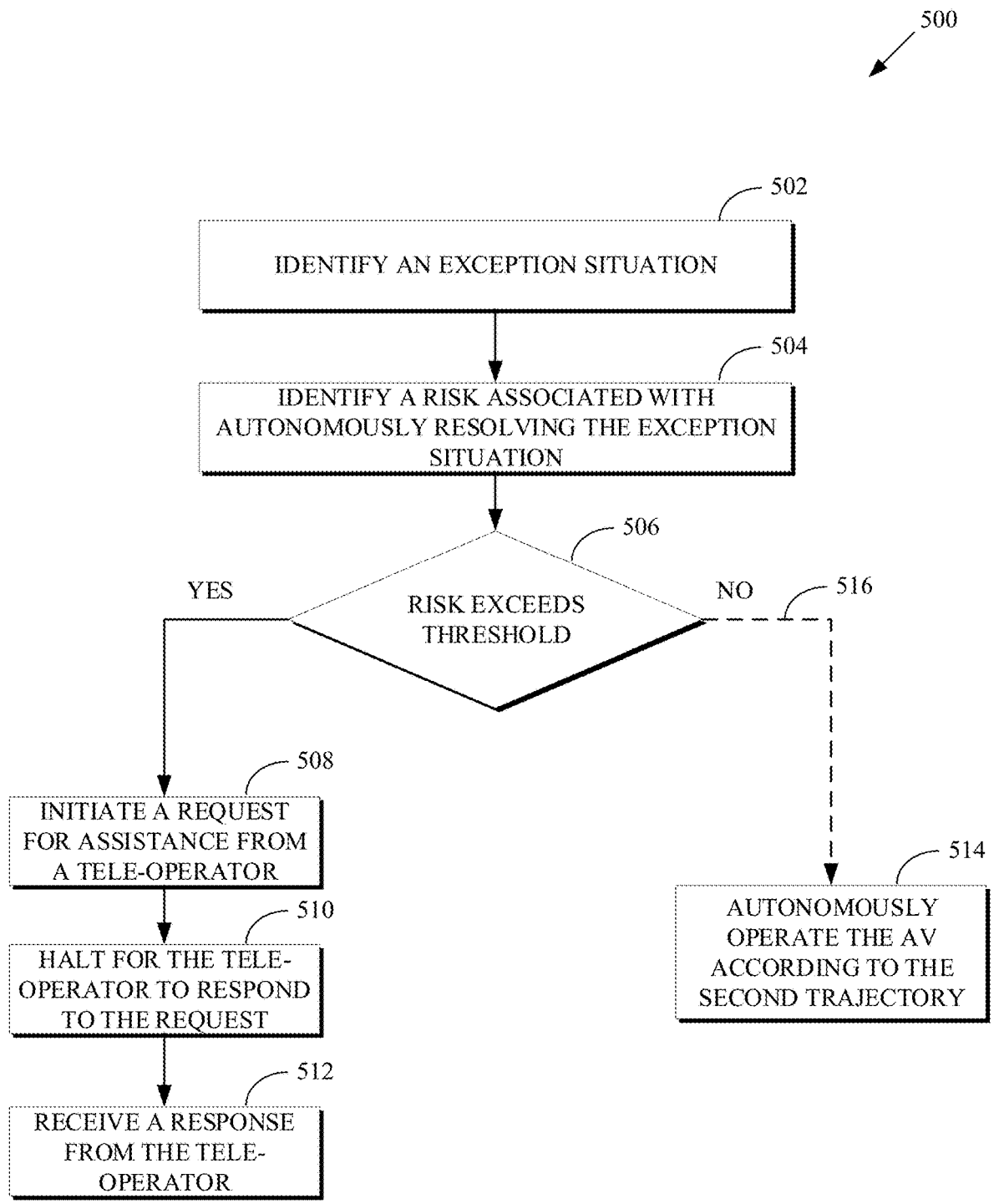
FIG. 5 is a flow chart of a technique for exception handling by an autonomous vehicle according to implementations of this disclosure.

FIG. 5 is a flow chart of a technique 500 for exception handling by an autonomous vehicle (AV) according to implementations of this disclosure. Some or all of the technique 500 for exception handling may be implemented in a vehicle (e.g., an autonomous vehicle) including the vehicle 1050 shown in FIG. 1, the vehicle 2100 shown in FIG. 2, one of the vehicles 340/350/360/370 of FIG. 3, or a computing apparatus including a controller apparatus such as the controller apparatus 2410 shown in FIG. 2. The controller apparatus can include an exception handling module (such as the system 400 of FIG. 4) or the controller apparatus can comprise an exception handling module. In an implementation, some or all aspects of the technique 500 for exception handling can be implemented in a system combining some or all of the features described in this disclosure. The technique 500 can be executed, partially or fully, by at least some of the modules of the system 400 of FIG. 4.

At 502, the technique 500 identifies an exception situation. In an implementation, identifying an exception situation can include identifying an obstruction of a first trajectory of the AV, determining a second trajectory that avoids the obstruction, and determining that the second trajectory violates a driving norm.

Figure 6A:
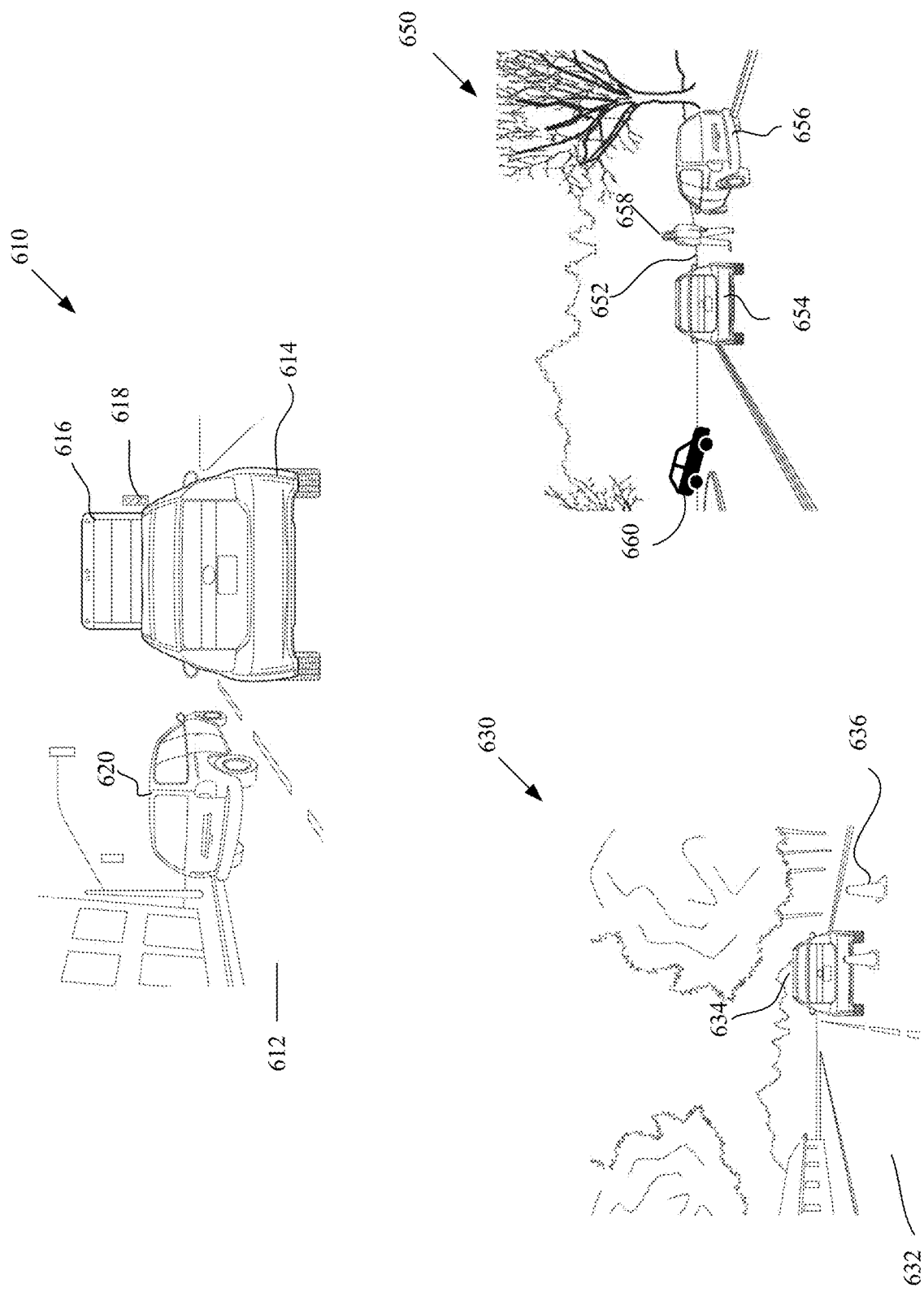
FIGS. 6A-6B are block diagrams illustrating examples of obstruction situations according to implementations of this disclosure.
Figure 6B:
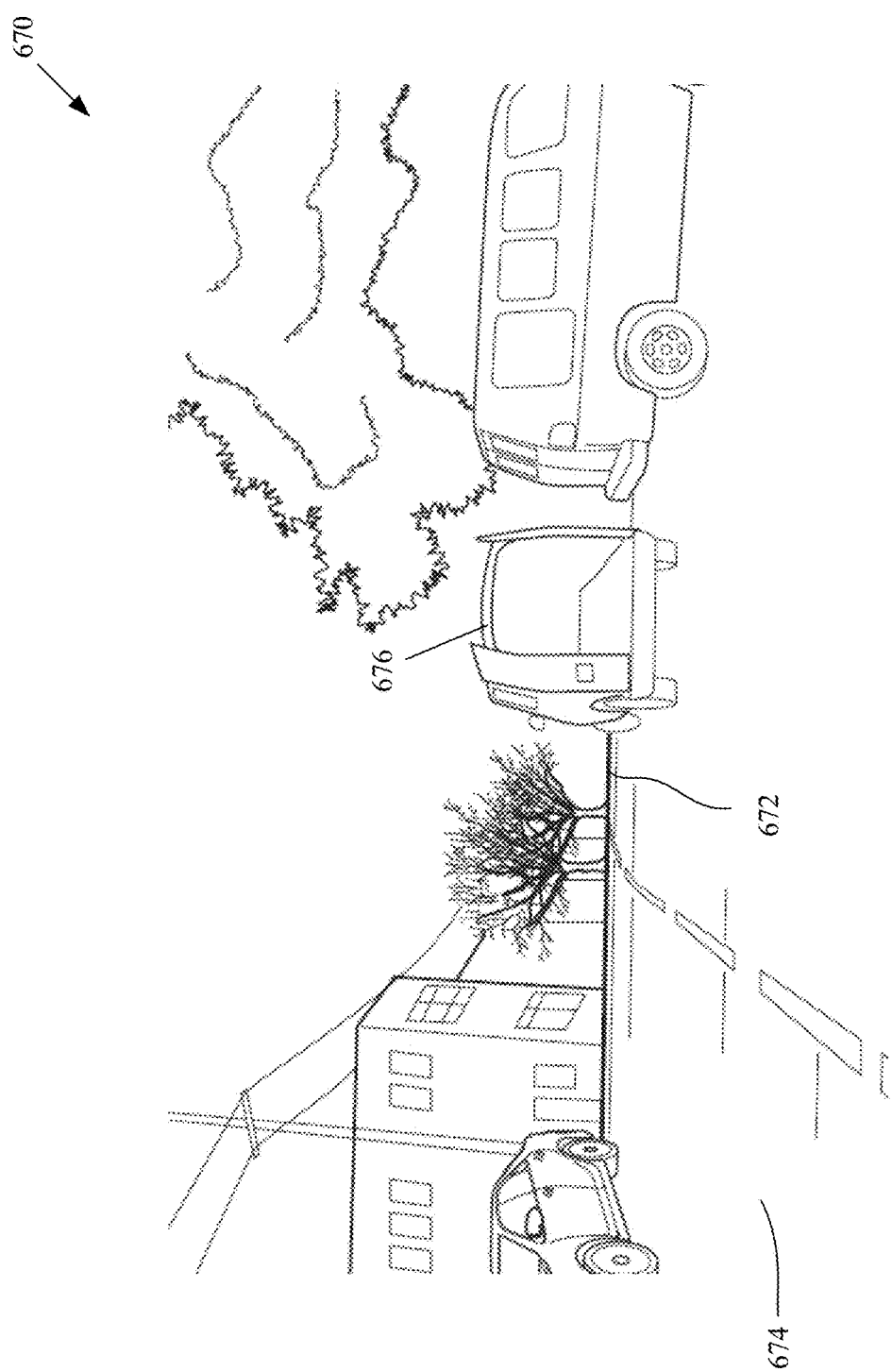

FIGS. 6A-6B are block diagrams illustrating examples of obstruction situations 610, 630, 650, 670 according to implementations of this disclosure. The obstructions situations 610, 630, 650 are depicted from a point of view of, for example, a front facing camera and/or sensors of an AV (not shown). That is, in each of the obstruction situations 610, 630, 650, the illustrated example depicts the view (e.g., the obstruction scene) as perceived through one or more sensors of the AV.

In the obstruction situation 610, the AV is depicted in a right lane of a two-lane road, including a left lane 612. The AV is stopped behind a vehicle 614, which in turn is stopped behind a truck 616. The vehicle 614, the truck 616, and any other road users described with respect to any other figure(s) can be maintained by a world model module 402 of the AV. The AV can detect the obstruction situation based on at least one or more criteria. For example, the obstruction situation can be detected if the path of the AV remains obstructed for more than a predefined period of time.

The predefined period of time can be 1 minute, 2 minutes, or some other predefined period of time. In an example, the predefined period of time may depend on an average traffic signal time that is proximate to the AV. For example, the AV (or a module thereof) may include (or have access to) High Definition (HD) map information that can include traffic signal information. Similarly, the AV can include a global positioning sensor (GPS). As such, using a location of the AV (using the GPS information) and the map information, the AV can determine the average traffic signal time.

In another example, the AV can detect the obstruction situation because a traffic signal 618 has turned green, a vehicle 620 in the left lane 612 is moving forward, some other criteria, or a combination thereof, yet the path of the AV remains obstructed. The HD map information can include accurate information regarding a vehicle transportation network to within a few centimeters. For example, the HD map information can include details regarding road lanes, road dividers, traffic signals, traffic signs, speed limits, and the like.

In an example, a trajectory planning module of the AV, such as the trajectory planning module 404 of FIG. 4, can be used to determine that the path (e.g., trajectory) of the AV is obstructed. For example, the trajectory planning module can determine that if the AV were to continue along its current trajectory, then the AV will encounter (e.g., collide with) a static blockage (i.e., the vehicle 614) within 0.5 seconds. As mentioned above, an instance of the trajectory planning module can be used to determine a trajectory for the vehicle 614. If the vehicle 614 has not moved for a certain period of time, then state information in the world model module 402 can indicate that the vehicle 614 is a static object.

The obstruction situation 630 illustrates the AV as traveling on a one-lane road where a lane 632 is for the opposite direction traffic. A vehicle 634 is stopped. State information of the vehicle 634 (such as state information that can be maintained by a world model module, such as the world model module 402 of FIG. 4) can indicate that the vehicle 634 is stopped. In some examples, the AV (such as via sensors of the AV) can determine that the hazard lights of the vehicle 634 are flashing. In some examples, the AV can detect that pylons 636 are placed behind the vehicle 634.

The obstruction situation 650 illustrates that the AV is approaching an intersection 652. The AV can identify the intersection based on map information that can be available to the AV. A vehicle 654 and a vehicle 656 are stopped. However, an obstruction module of the AV, such as the obstruction module 406 of FIG. 4, may not be able to determine with certainty whether at least one of the vehicles 654, 656 is stopped at the intersection or stopped for some other reason. A pedestrian 658, and a vehicle 660 are also detected in the scene. As mentioned, the world model module 402 of the AV can maintain state information associated with each of the vehicles 654, 656, 660 and the pedestrian 658.

The obstruction situation 670 illustrates that the AV is approaching an intersection 672. The intersection 672 is at the top of a hill. As such, sensors of the AV cannot observe other world objects that may be on the other side of the hill in an opposite-direction lane 674. A vehicle 676 is stopped. The vehicle 676 is obstructing the path of the AV. In some examples, the AV may be able to detect that the vehicle 676 is a van. An obstruction module of the AV, such as the obstruction module 406 of FIG. 4, can identify the vehicle 676 as loading/unloading because the backdoors of the vehicle 676 are opened.

As mentioned above, the AV can determine a trajectory that avoids (e.g., navigates around) the obstruction. In an example, a trajectory planning module, such as the trajectory planning module 404 of FIG. 4, can be used to determine one or more trajectories for navigating around the obstruction. The obstruction module can instruct the trajectory planning module to generate trajectories such that operating the AV according to the trajectories would violate traffic norms.

With respect to the obstruction situation 610, the AV can determine a trajectory whereby the AV uses the left lane 612. The direction of traffic of the left lane 612 is the same as that of the AV. As such, by moving to the left lane 612, the AV does not violate any traffic norms. In another example, the AV can decide to continue stopping behind the vehicle 614 (for example, because the left lane 612 is not clear). In such a situation (e.g., continuing to stop behind the vehicle 614), traffic norms are also not violated. Because no traffic norms are violated, the AV can classify the obstruction situation 610 as a normal obstruction situation.

On the other hand, the obstruction situations 630, 650, 670 are classified as exception situations because, to get around the obstruction, the AV would have to cross the center line of the road and travel on an opposite-traffic lane (e.g., the lane 632 or the opposite-direction lane 674).

At 504 of FIG. 5, the technique 500 identifies a risk associated with the exception situation. That is, the technique 500 identifies a risk associated with autonomously resolving the exception situation, such as resolving the exception situation without human (e.g., a tele-operator) supervision. Said another way, the technique 500 can identify the risk associated with a determined trajectory for navigating around the obstruction. In an example, the risk can be identified by a risk evaluation module, such as the risk evaluation module 408 of FIG. 4. In an example, the risk can be considered to be a measure of understanding by the AV. In another example, the risk can be based on a weighting of the understanding by the AV of the obstruction scene and the consequences of following the second trajectory that avoids the obstruction.

With respect to the obstruction situation 630 of FIG. 6A, the risk associated of autonomously navigating around the obstruction are not high. However, since navigating around the obstruction requires violating traffic norms (e.g., traveling on the lane 632), the risk is a medium ("Yellow," per Table I) risk. The lane 632 is an oncoming (i.e., opposite-direction) traffic lane. In an example, driving in the lane of oncoming traffic can be considered of at least a medium (e.g., yellow) risk.

The vehicle 634 is most likely permanently stopped because other indicia (e.g., the pylons 636 or flashing lights) in the scene indicate so. As such the risk associated with suspending the traffic norms are not high. The risk is a medium risk (e.g., "Yellow," per Table I). However, even if it cannot be determined with high certainty whether the vehicle 634 is permanently stopped, the risk is still not high because the sensors of the AV can perceive (e.g., see) far ahead.

The consequences of misclassifying the vehicle 634 as permanently stopped are also not high. For example, if the vehicle 634 starts to move while the AV is in the process of operating the second trajectory that avoids the obstruction, thereby overtaking the vehicle 634, then the technique 500 would have to determine whether to accelerate the AV further to completely overtake the vehicle 634 or slow down the AV to allow the vehicle 634 to pass ahead of the AV. In either situation, the consequence has low severity because there is ample road ahead (i.e., a clear view ahead).

With respect to the obstruction situation 650 of FIG. 6A, the risk is high (e.g., "Red," per Table I). This is so because it cannot be determined whether the vehicles 654 and 656 are yielding to something in front of them. Additionally, HD map data can indicate the presence of the intersection 652. As such, the vehicles 654 and 656 could be legitimately stopped for some other reason; namely, the vehicles 654 and 656 could be yielding at the intersection. The risk is also high because a person (i.e., the pedestrian 658) is detected in the scene. The risk can be considered high at least because i) the person may not be behaving as a typical pedestrian may be expected to and/or ii) the vehicles 654 and 656 may be legitimately stopped at the STOP intersection ahead. For example, instead steadily walking from one side of the road to the other, the person may be almost stationary.

Additionally, the identity (e.g., role) of the pedestrian 658 may not be determinable with certainty. For example, the pedestrian 658 may be a motorist that has stopped to talk to another motorist. If this is the situation, the risk may be lower than if the pedestrian 658 were classified as a traffic controller or a policeman. In an example, the risk can be set to high (e.g., "Red," per Table I) whenever pedestrians (e.g., humans) are detected in the scene.

With respect to the obstruction situation 670, the risk is high (e.g., "Red," per Table I) because to navigate around the obstruction, the AV would have to travel on the opposite-direction lane 674 but with an obstructed view of what is on the other side of the hill. The risk (e.g., the risk of passing) can be determined to be high because the vehicle 676 may be yielding to another road user at a STOP intersection.

At 506, the technique 500 determines whether the risk exceeds a threshold. If the risk does exceed the threshold, then the technique 500 proceeds to 508. In an implementation, and as illustrated by a dashed line 516, if the risk does not exceed the threshold, the technique 500 can proceed to 514.

The threshold can be such that it can be compared to the risk. For example, if the risk is a percentage, then the threshold can also be specified as (or can be converted to) a percentage (e.g., 60%, 70%, or some other percentage). For example, if the risk is an ordinal value, then the threshold can be (or can be converted to) one of the ordinal values. For example, if the risk can be, in increasing severity, one of the values "low"/"green" "medium"/"yellow," or "high"/"red" then the threshold may be "medium"/"yellow." As such, if the risk is determined to be "high"/"red" and the threshold is selected to be "medium"/"yellow," then the technique 500 proceeds to 508. In an example, the risk can correspond to a classification. For example, the obstruction situation can be classified into one of the classes normal, low, high or some other classification.

At 508, the technique 500 initiates a request for assistance from a tele-operator. Initiating the request can include initiating a request for assistance to one of more remote vehicle assistance centers, such as the remote vehicle assistance center 300 of FIG. 3. As such, a tele-operator, such as one of the tele-operators 320, 330 of FIG. 3 can respond to the request. The request can be transmitted via an electronic communication interface, such as the electronic communication interface 1370 of FIG. 1. At 510, while the technique 500 waits for instructions from a tele-operator, the technique 500 causes the AV to halt (e.g., wait) in place behind the obstruction. That is, the AV safely halts and waits for the tele-operator to respond, if the tele-operator has not done so already.

The request can include information (e.g., state data) that can be useful to a tele-operator in responding to the request. The information can be included in the request when the request is initiated. In some examples, at least some of the information can be transmitted by the technique 500 in response to a request for that information from one or more systems used by a tele-operator. As such, some of the information may be pushed to a system of the tele-operator. Whether information is pushed from or pulled from the vehicle, such information is collectively referred to as transmitted information.

The state data can include, but is not limited to, data that indicates the state or condition of the vehicle that is executing the technique 500, including any of kinetic state data relating to any of the velocity and acceleration of a vehicle, location data, including the geographical location of a vehicle (e.g., the latitude and longitude of the vehicle) or the location of the vehicle with respect to another object, vehicle position, including the orientation and inclination (e.g., slope of the vehicle on an incline) of the vehicle, the operational state of the vehicle, including the electrical state or mechanical state of the vehicle (e.g., health of the electrical vehicle systems, mechanical vehicle systems, tire pressure, etc.), maintenance data related to maintenance of the vehicle, energy source data including an amount of fuel remaining or an amount of battery charge remaining, sensor data based on outputs from sensors including, optical sensors, audio sensors, an motion sensors, internal state data, including a temperature and humidity inside the passenger cabin of the vehicle, and a current task (e.g., pick up a passenger) of the vehicle.

The transmitted information can also include state information of other road users that are maintained in a world model module, such as the world model module 402 of FIG. 4. For example, state of an object that is, or is a part of, the obstruction, and/or the state of other objects proximal to the vehicle can be included in the transmitted information. For example, zero or more of a velocity, a pose, a geometry (such as width, height, and depth), a classification (e.g., bicycle, large truck, pedestrian, road sign, etc.), a location, other information, or a subset thereof can be transmitted from the vehicle so that the tele-operator can have sufficient information to determine a response.

Figure 7:
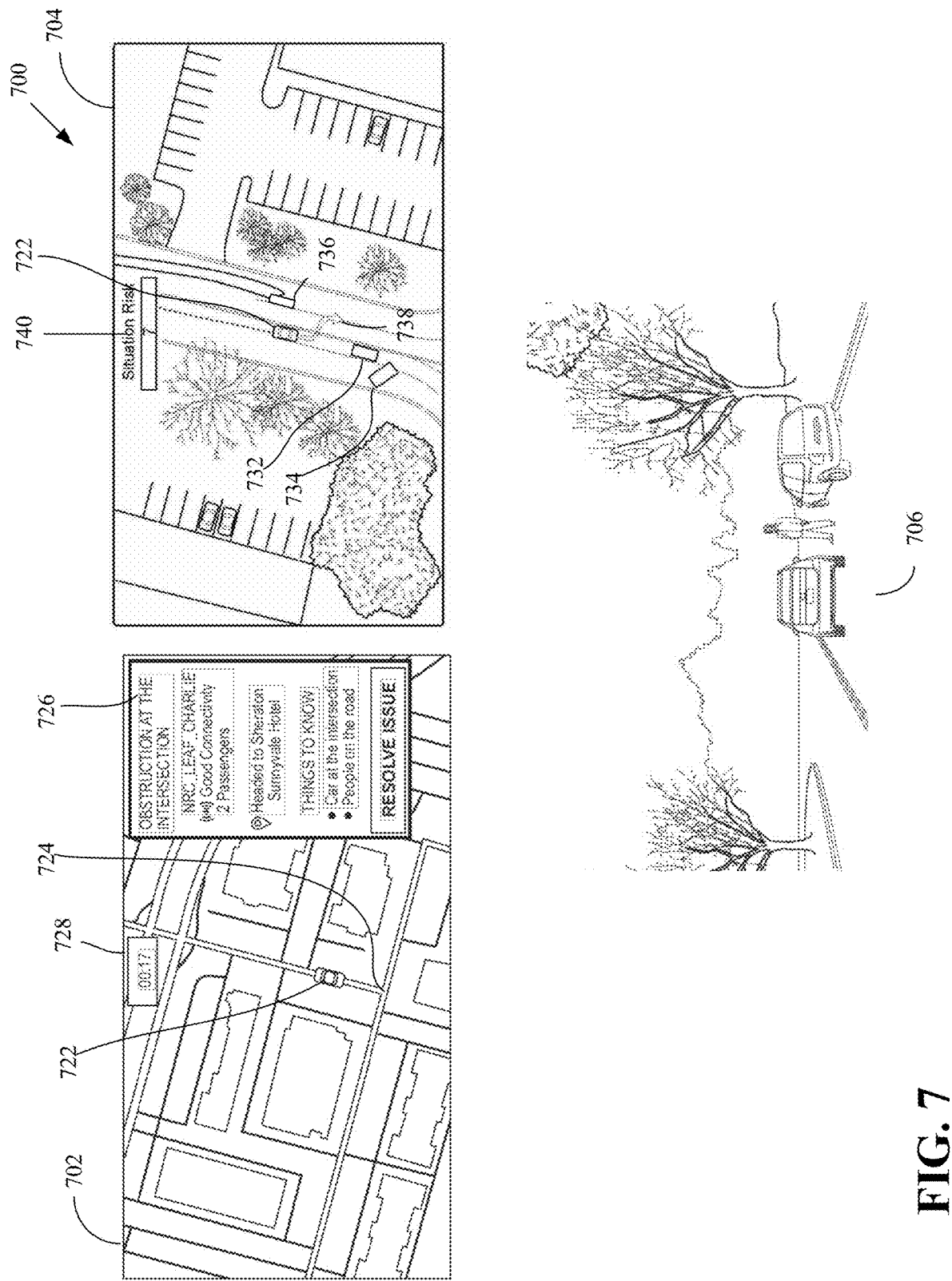
FIG. 7 is an illustration of user interfaces 700 of a tele-operator according to implementations of this disclosure.

FIG. 7 is an illustration of user interfaces 700 of a tele-operator according to implementations of this disclosure. The user interfaces 700 are mere illustrative examples of visual information that a tele-operator may need in order to respond to the request. One or more of the user interfaces 700 can be displayed (or available for display) to a tele-operator. The user interfaces 700 include a map view 702, an augmented view 704, and a dashcam view 706. However, the user interfaces 700 can include more, fewer, or other user interfaces and/or information that can aid the tele-operator in responding to the received request.

The map view 702 depicts one or more vehicles that are managed by the tele-operation center. The one or more vehicles are overlaid on a street map. The map view 702 illustrates that the vehicle 722 is approaching an intersection 724. The map view 702 can be generated using location information that is received from the vehicle 722. That is, the vehicle 722 can regularly (e.g., every several milliseconds) send its location information to a system that enables the creation of the view 704. The map view 702 illustrates a ticket view 726, which is further described with respect to FIG. 8. A timer 728 can indicate how long the vehicle 722 has been stopped.

The augmented view 704 illustrates a satellite view of empty streets overlaid with the vehicle 722 and other road users. The other road users include any road users that constitute the obstruction and/or other proximal road users. The state information transmitted by technique 500 can be used to generate the augmented view 704. For example, pose and size state information of the other road users can be used to create the augmented view 704. A vehicle 732, a vehicle 734, and a vehicle 736 are augmented information that correspond, respectively, to the vehicles 654, 654, and 660 of FIG. 6A. As the augmented view 704 is generated at a different point in time than that of the obstruction situation 650, the different road users have different poses, locations, and orientations. That is, the augmented view 704 can be an up-to-date (e.g., near real-time) view of the obstruction situation.

As mentioned above, the technique 500 can determine a second trajectory that avoids the obstruction. The second trajectory can be transmitted in the request to the tele-operations center. In such a case, the augmented view 704 can include a trajectory indicator 738 that illustrates the second trajectory. The second trajectory can be transmitted in the form of a series of locations, which are connected in the augmented view 704 as the trajectory indicator 738. The augmented view 704 can also include an indicator (i.e., a risk indicator 740) of the risk as identified by the technique 500. The risk indicator 740 illustrates that the technique 500 determined the risk to be 7 (e.g., 7 out of a maximum risk of 10). The risk as identified by the technique 500 can be included in the transmitted information.

In an example, the technique 500 can transmit (e.g., in near real-time) one or more dashcam images. That is, the vehicle may be equipped with a camera that is directed towards the front of the vehicle such that the camera can capture images of the obstruction scene. In some examples, the camera can be a video camera. The dashcam view(s) may be displayed to the tele-operator as the dashcam view 706.

Figure 8:
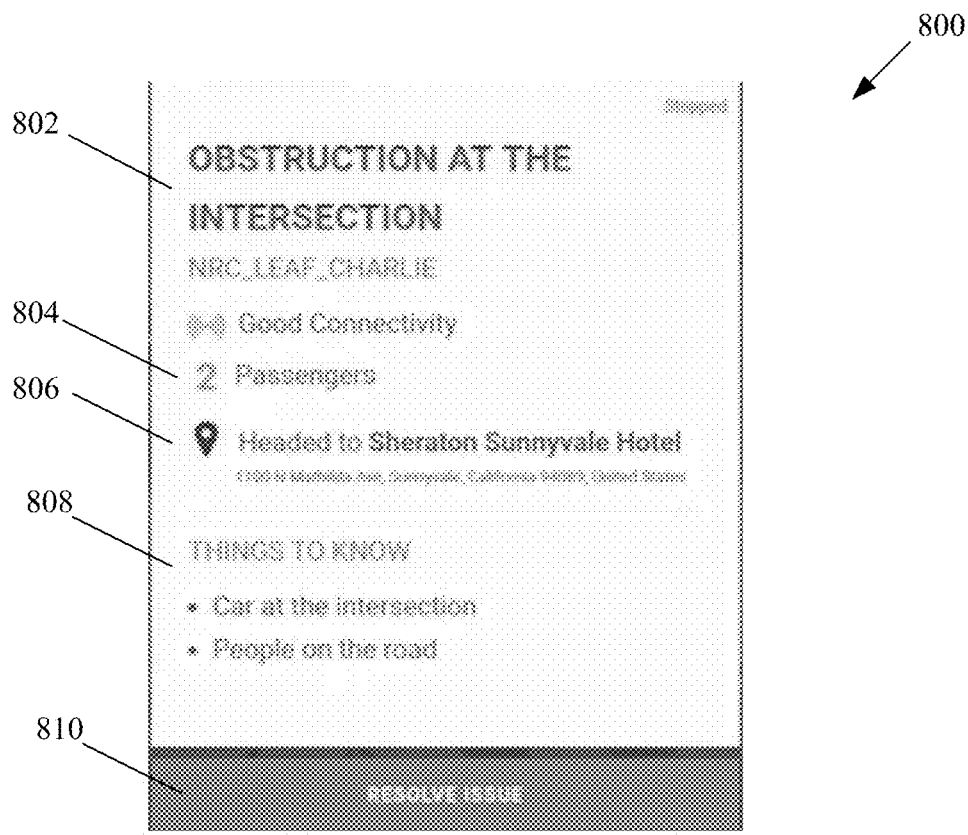
FIG. 8 is an illustration of a ticket according to implementations of this disclosure.

FIG. 8 is an illustration of a ticket 800 according to implementations of this disclosure. The ticket 800 illustrates an example of what may be presented to a tele-operator at a tele-operations center in response to an AV initiating a request for tele-operator assistance. The ticket 800 includes an exception description 802, occupancy information 804, destination information 806, feature information 808, and an action button 810. In some implementations, more, fewer, other information or actions, or a combination thereof can be displayed in the ticket.

The exception description 802 can be a summary of the nature (e.g., type) of the exception situation. For example, with respect to the obstruction situation 670 of FIG. 6B, the exception description 802 can be "VIEW OF INCOMING TRAFFIC OBSTRUCTED BY HILL." The occupancy information 804 can describe whether there are any, and/or the number of, passengers in the AV. For example, the AV may be executing a robo-taxi (i.e., autonomous taxi) service at the time of the occurrence of the exception situation. As such, there would be passengers in the AV. In another example, the AV may be on its way to a service and maintenance center following passenger drop off. As such, no passengers may be in the AV. To what extent the AV may be allowed to suspend (e.g., disobey, deviate from) traffic norms in order to circumvent the obstruction may depend on whether passengers are in the AV.

The destination information 806 can indicate the next destination of the AV. Alternatively or additionally, the destination information 806 can indicate a final destination of the AV. For example, the AV may be scheduled to make stops along a route to a final destination. As such, any of locations of the stops and/or the final destination can be listed in the destination information 806.

The feature information 808 can include values of features that are important and/or relevant to resolving the exception situation. As mentioned above, the features can include whether any other world objects are present in the scene, the location of the AV on an HD map, the speed of the AV, the visibility from the AV, specific features regarding stopped vehicles, fewer information, additional information, or a combination thereof. For example, features regarding other world objects can include whether there are any of vehicles, bicycles, pedestrians and their respective numbers. The location of the AV on the HD map can include the type of road, the presence of traffic signs (e.g., traffic lights, stop signs, etc.), intersections, and the like. The visibility from the AV can include whether the view of the AV is blocked by a stopped vehicle, the presence of a hill, and the like. Other features regarding stopped vehicles can include whether hazard lights are on, whether and which doors are open, whether pedestrians are loading or unloading, and the like.

A tele-operator can select (e.g., click, activate, press, etc.) the action button 810 when the tele-operator is ready to resolve the ticket. When the action button 810 is selected, the tele-operator can evaluate the obstruction situation, such as by observing, in real time (or near real time) the augmented view 704, the dashcam view 706, or any other views. The tele-operator can also evaluate the trajectory indicator 738. The tele-operator can be presented with a menu, as described with respect to FIG. 9, for selecting a response.

Figure 9:
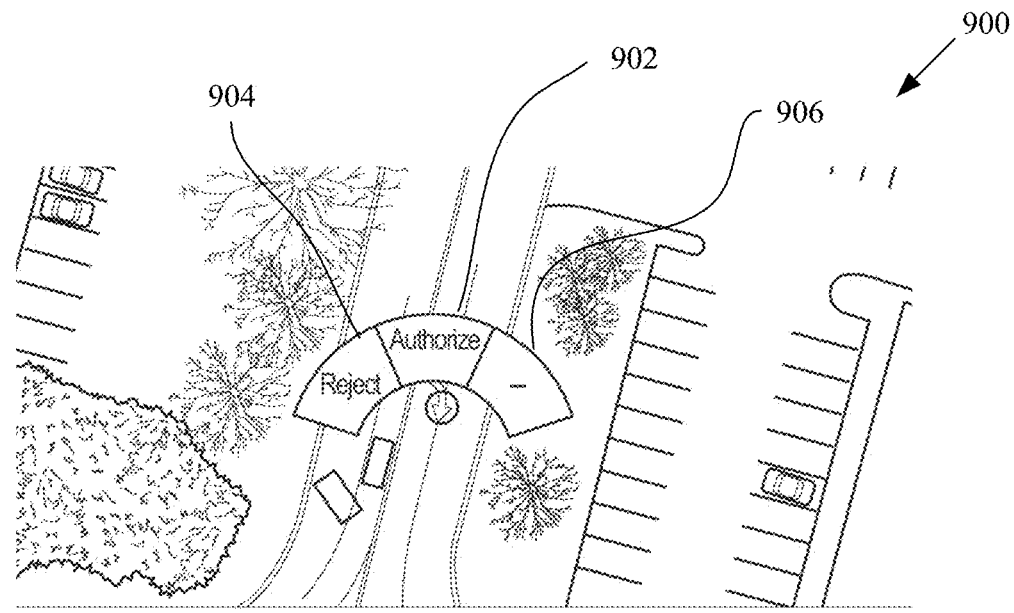
FIG. 9 is an illustration of menu of responses of a tele-operator according to implementations of this disclosure.

FIG. 9 is an illustration of menu 900 of responses of a tele-operator according to implementations of this disclosure. In an implementation, the menu 900 can be displayed in the augmented view 704 proximal to the trajectory indicator 738. For example, the menu 900 can overlay the trajectory indicator 738 in response to the tele-operator clicking on or proximal to the trajectory indicator 738. The menu 900 includes three options, each option corresponding to a response of the tele-operator. However, more, fewer, or other response options may be possible. By selection a menu option from the menu 900, the tele-operator causes instruction data to be transmitted to the AV. The instruction data can be transmitted through a network including a wireless network (e.g., cellular network) or any other communication link, system, or platform between the remote support system and the vehicle being monitored/supported, such as described with respect to FIG. 2.

The instruction data can include but is not limited to instructions to be performed by the AV or an occupant of the vehicle (e.g., a driver, a passenger). The instruction data can include data associated with any of controlling movement of a vehicle, including changing the acceleration, velocity, or direction (e.g., steering), of the vehicle, activating or deactivating (e.g., turning some or all parts of the vehicle on or off) a control system in the vehicle, including mechanical control systems and electrical control systems, activating or deactivating sensors in the vehicle (e.g., activating a camera to view the interior of the vehicle or an area outside the vehicle), activating or deactivating a communication system including any of internal communication systems (e.g., internal speakers directed at vehicle occupants) and external communication systems (e.g., external speakers directed at objects or individuals outside of the vehicle).

In an implementation, transmitting the instruction data to the AV can include transmitting driving route data (i.e., a third trajectory) for implementation by an autonomous device or system of the vehicle. The third trajectory can be a short-term path around an obstruction situation. The third trajectory can be a new route to a destination such that the new route circumvents the obstruction situation. As such, the driving route data can include instructions to modify an existing driving route for the vehicle.

In another implementation, transmitting the instruction data to an autonomous vehicle can be associated with ignoring at least one operating constraint of the autonomous operation to allow the first vehicle to traverse the driving route. As an example, autonomous operation of a vehicle can include operating constraints that prohibit certain types of actions by the vehicle, including any of violating a speed limit, including driving too rapidly or driving too slowly, violating a traffic regulation, including driving in the opposite direction of traffic, and driving away from a road surface. By ignoring an operating constraint, a vehicle is able to perform prohibited actions in accordance with instructions in the instruction data. For example, circumventing a construction zone could include driving in a portion of the roadway that was previously restricted such as when the portion of the roadway isn't a paved road surface and is instead a dirt road.

By selecting a menu option 902 (i.e., "Authorize"), the tele-operator authorizes to AV to proceed along the second trajectory that is proposed by the AV. That is, the technique 500 receives a response to proceed. By selecting a menu option 904 (i.e., "Reject"), the tele-operator instructs the AV to continue to wait (e.g., halt in place to await further instructions). That is, the technique 500 receives a response to wait. By selecting a menu option 906, the tele-operator can select (e.g., draw, define, etc.) a new route (i.e., a third trajectory) to be followed by the AV.

Referring again to FIG. 5, at 512, the technique 500 receives a response (i.e., a received response) from the tele-operator. As already mentioned, the response can be one of a first response to wait, a second response to proceed, or a third response that includes a trajectory.

The technique 500 can further include, in response to the response being a proceed response, operating the AV according to the second trajectory. For example, the tele-operator can authorize (such as by selecting the menu option 902 as described with respect to FIG. 9) the second trajectory, which is indicated by the trajectory indicator 738 of FIG. 7. As such, the technique 500 can operate or cause the AV to be operated according to the trajectory indicator 738. The technique 500 can further include that, in the case that the response is a response that includes a trajectory, such as a third trajectory, the technique 500 can operate, or cause the AV to be operated, according to the third trajectory.

At 514, that is, in response to the risk not exceeding the risk threshold, the technique 500 operates the AV according to the second trajectory.

In an implementation, the technique 500 can include revoking the request to the tele-operator. For example, while the technique 500 is halting at 510, the obstruction may clear. Referring to the obstruction situation 650 of FIG. 6A, while the AV is halting, the vehicle 654 proceeds forward and the pedestrian 658 exists the scene (such as by entering the vehicle 656). The technique 500 may determine (such as using a trajectory planning module) that there is enough clearance in the road to pass by the vehicle 656 and that the path of the AV is no longer obstructed. As such, the AV can proceed normally. Therefore, tele-operator assistance is no longer required. As such, in response to determining that the exception situation is cleared, the technique 500 can revoke (e.g., cancel, withdraw, etc.) the request to the tele-operator. In another example, even if the obstruction clears, the AV continues to halt until the technique 500 receives a response to the request. That is, the technique 500 cannot revoke the ticket.

Figure 10:
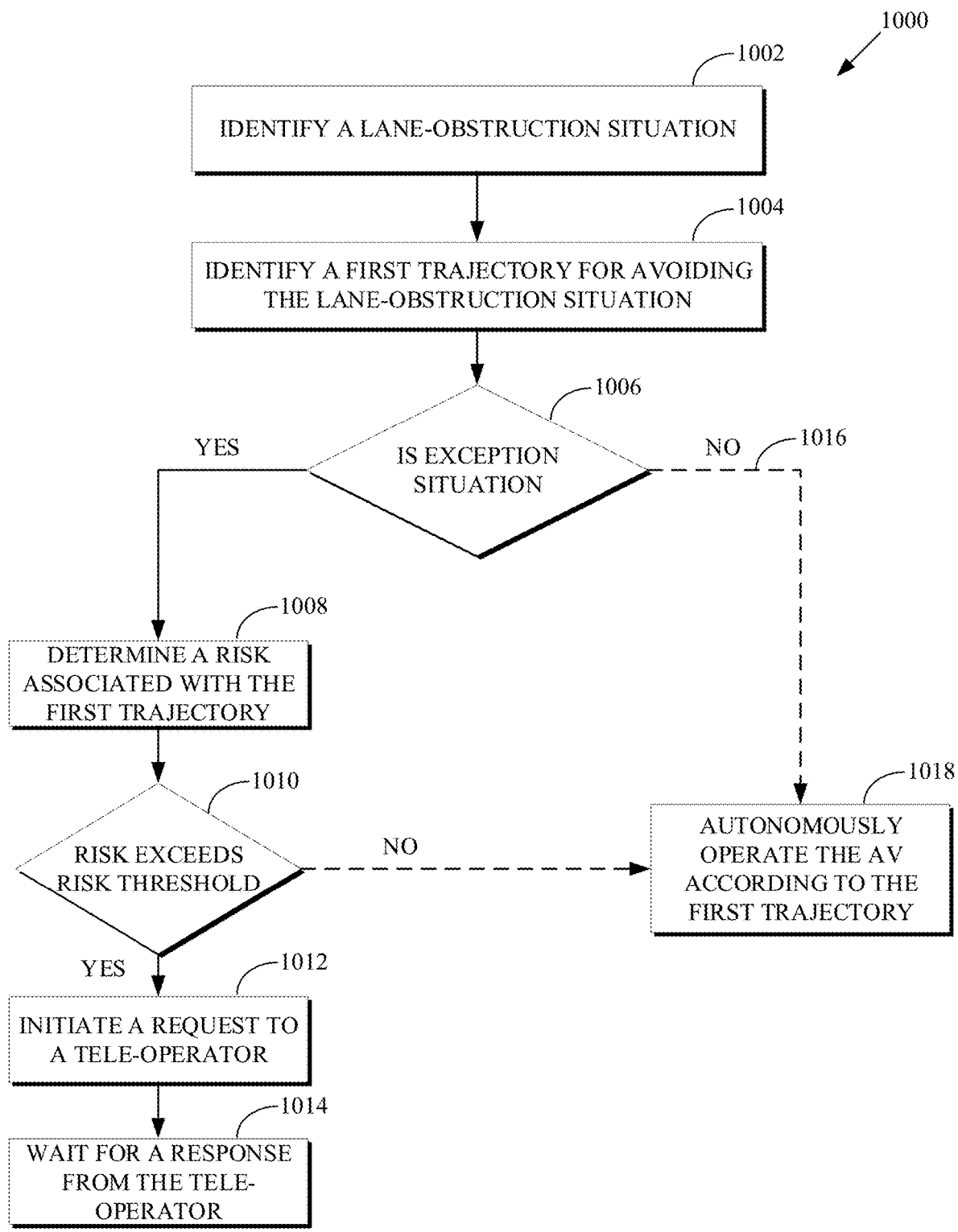
FIG. 10 is a flow chart of a technique for exception handling by an autonomous vehicle according to implementations of this disclosure.

FIG. 10 is a flow chart of a technique 1000 for exception handling by an autonomous vehicle (AV) according to implementations of this disclosure. Some or all of the technique 1000 for exception handling may be implemented in a vehicle (e.g., an autonomous vehicle) including the vehicle 1050 shown in FIG. 1, the vehicle 2100 shown in FIG. 2, or a computing apparatus including a controller apparatus such as the controller apparatus 2410 shown in FIG. 2. The controller apparatus can include an exception handling module (such as the system 400 of FIG. 4) or the controller apparatus can comprise an exception handling module. In an implementation, some or all aspects of the technique 1000 for exception handling can be implemented in a system (e.g., the controller apparatus 2410 of FIG. 2) combining some or all of the features described in this disclosure. The technique 1000 can be executed, partially or fully, by at least some of the modules of the system 400 of FIG. 4.

At 1002, the technique 1000 identifies a lane-obstruction situation. For example, an obstruction module, such as the obstruction manager module 406 of FIG. 4, can determine that the trajectory of the AV is obstructed because, should the AV proceed along its current trajectory, the AV would collide with an obstruction. For example, the identified lane-obstruction situation can be the obstruction situation 650 of FIG. 6A. At 1004, technique 1000 identifies a first trajectory for avoiding the lane-obstruction situation. For example, a trajectory planning module, such as the trajectory planning module 404 or FIG. 4, can identify the trajectory that is indicated by the trajectory indicator 738 of FIG. 7.

At 1006, the technique 1000 determines whether the obstruction situation is an exception situation. For example, if the obstruction module determines that the first trajectory violates one or more traffic norms, then the obstruction situation is identified as an exception situation and the technique 1000 proceeds to 1008; otherwise, in an implementation, the technique 1000 proceeds to 1018. At 1018, the technique 1000 operates, or causes the AV to be operated, according to the first trajectory. Referring again to FIGS. 6A-6B, whereas the obstruction situation 610 would not be determined to be an exception situation, the obstruction situations 630, 650, 670 would be determined to be exception situations.

At 1008, the technique 1008 determines a risk associated with the first trajectory. The risk can be determined by a risk evaluation module, such as risk evaluation module 408 of FIG. 4. If the risk exceeds a risk threshold, the technique 1000 proceeds to 1012; otherwise, the technique 1000 can proceed to 1018.

At 1012, the technique 1000 initiates a request to a tele-operator. Initiating the request can be as described with respect to 508 of FIG. 5. As such, the request can include the first trajectory. At 1014, the technique 1000 waits for a response from the tele-operator. That is, the technique 1000 can halt, or cause the AV to be halted, while waiting for a response from the tele-operator.

In an implementation, the technique 1000 can include, in response to receiving a proceed response from the tele-operator, operating the AV according to the first trajectory. The technique 1000 can include receiving, such as in the case of a response that includes a trajectory, a second trajectory from the tele-operator; and operating the AV according to the second trajectory.

The steps, or operations, of any method, process, technique, or algorithm described in connection with the implementations of the disclosed technology herein, may be implemented in hardware, firmware, software executed by hardware, circuitry, or any combination thereof. To facilitate explanation, the techniques 500 and 1000, shown in FIGS. 5 and 10, are depicted and described as a series of operations. However, the operations in accordance with this disclosure can occur in various orders or concurrently. Additionally, operations in accordance with this disclosure may occur with other operations not presented and described herein.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Implementations of this disclosure provide technological improvements particular to computer networks and autonomous vehicle management, for example, those concerning the extension of computer network components to generate solutions associated with the operation and monitoring of autonomous vehicles. The development of new ways to generate solution data to, for example, generate solution data to address mechanical and electronic malfunctions in autonomous vehicles, or to overcome the limitations in programming of autonomous vehicles, is fundamentally related to autonomous vehicle related computer networks.

Implementations of this disclosure provide at least a system and method for the generation of solution data and transmission of the solution data to a vehicle or vehicles for execution (i.e., for using the solution data to solve an encountered issue/problem). The systems include a controller apparatus for generating state data for a vehicle using received sensor data. The state data can include any of a location, a destination, and an operational state of the vehicle. For example, the location of the vehicle can be generated based on map data associated with the vehicle that has been received from a global positioning satellite (GPS). In response to determining that the generated state data satisfies a state criterion, a determination of solution profile data that matches the state data is made on the basis of a comparison of the state data to the solution profile data. The solution profile data can be based on solutions from an aggregation of solution data from past events in which assistance was provided to an autonomous vehicle. Solution data can be generated based on the matching solution profile data and subsequently transmitted to the vehicle for execution. For example, the solution data can include a solution to a request for assistance from the driver of an autonomous vehicle.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of exception handling by an autonomous vehicle (AV), the method comprising:
    identifying an exception situation in response to detecting a stopped vehicle ahead of the AV;
    identifying a risk associated with autonomously resolving the exception situation,
        wherein the risk is identified as a weighting of a situation likelihood and a consequence of autonomously resolving the exception situation,
        wherein the situation likelihood relates to whether the stopped vehicle is permanently or temporarily stopped and the situation likelihood is determined based on at least two of:
            whether hazard lights of the stopped vehicle are flashing,
            how long the stopped vehicle has been stopped,
            whether the stopped vehicle is at an intersection,
            whether pylons are present, or
            whether the stopped vehicle was classified as a moving vehicle at a previous time step; and
        wherein the consequence relates to a cost of overtaking the stopped vehicle and is determined based on whether the AV has a clear view ahead and sufficient lateral space to overtake the stopped vehicle; and
    in response to the risk exceeding a risk threshold:
        initiating a request for assistance from a tele-operator; and
        halting for the tele-operator to respond to the request; and
    receiving a response from the tele-operator.

2. The method of claim 1, wherein identifying the exception situation comprises:
    identifying an obstruction of a first trajectory of the AV;
    determining a second trajectory that avoids the obstruction; and
    determining that the second trajectory violates a driving norm.

3. The method of claim 2, further comprising:
    in response to the risk not exceeding the risk threshold, operating the AV according to the second trajectory.

4. The method of claim 3, further comprising:
    in response to the received response being a proceed response, operating the AV according to the second trajectory.

5. The method of claim 2,
    wherein the received response includes a third trajectory, further comprising:
    autonomously operating the AV according to the third trajectory.

6. The method of claim 1, wherein the received response from the tele-operator is selected from a set comprising a first response to wait, a second response to proceed, and a third response that includes a trajectory.

7. The method of claim 1, further comprising:
    identifying another exception situation;
    initiating another request for assistance from the tele-operator; and
    revoking the another request to the tele-operator.

8. The method of claim 7, wherein revoking the another request to the tele-operator comprises:
    in response to determining that the another exception situation is cleared before receiving a response from the tele-operator to the another request, revoking the another request to the tele-operator.

9. A method of exception handling by an autonomous vehicle (AV), the method comprising:
    identifying a lane-obstruction situation that is a stopped vehicle;
    identifying a first trajectory for avoiding the lane-obstruction situation; and
    in response to identifying, based on the first trajectory, that the lane-obstruction situation is an exception situation:
        determining a risk associated with the first trajectory,
            wherein the risk is identified as a weighting of a situation likelihood and a consequence of autonomously resolving the exception situation, and
            wherein the situation likelihood relates to whether the stopped vehicle is permanently or temporarily stopped and the risk is determined based on at least two of:
                whether the stopped vehicle is yielding or is permanently stopped;
                whether sensors of the AV can detect oncoming other world objects;
                whether a door of the stopped vehicle is open; or
                whether, to navigate around the stopped vehicle, the AV would have to travel on an opposite-direction lane; and
        in response to determining that the risk exceeds a risk threshold:
            initiating a request to a tele-operator, wherein the request includes the first trajectory; and
            waiting for a response from the tele-operator.

10. The method of claim 9, further comprising:
    in response to determining that the risk associated with the first trajectory does not exceed the risk threshold:
        autonomously operating the AV according to the first trajectory.

11. The method of claim 9, further comprising:
    in response to receiving a proceed response from the tele-operator, operating the AV according to the first trajectory.

12. The method of claim 9, further comprising:
    receiving a second trajectory from the tele-operator; and
    operating the AV according to the second trajectory.

13. An apparatus, comprising:
a memory, wherein instructions for exception handling by an autonomous vehicle (AV) are stored in the memory; and
a processor, the processor configured to execute the instructions to:
identify an exception situation;
identify a risk associated with autonomously resolving the exception situation,
wherein the risk is identified as a weighting of a situation likelihood and a consequence of autonomously resolving the exception situation,
wherein the situation likelihood is a measure of understanding, using sensor data from sensors of the AV, of the exception situation and relates to whether an identified person is a policeman or a traffic director, and
wherein the risk weighs the situation likelihood that the identified person is the policeman or the traffic director and the consequence of autonomously resolving the exception situation by ignoring instructions of the policeman or the traffic director; and
in response to the risk exceeding a risk threshold:
initiate a request to a tele-operator;
wait for the tele-operator to respond to the request; and
receive a response from the tele-operator.

14. The apparatus of claim 13, wherein to identify the exception situation comprises:
identify an obstruction of a first trajectory of the AV;
determine a second trajectory that avoids the obstruction; and
determine that the second trajectory violates a driving norm.

15. The apparatus of claim 14, wherein the instructions further comprise instructions to:
in response to the risk not exceeding the risk threshold, autonomously operate the AV according to the second trajectory.

16. The apparatus of claim 15, wherein the instructions further comprise instructions to:
in response to the received response being a proceed response, autonomously operate the AV according to the second trajectory.

17. The apparatus of claim 14,
wherein the received response includes a third trajectory, and
the instructions further comprise instructions to:
autonomously operate the AV according to the third trajectory.

18. The apparatus of claim 13, wherein the received response from the tele-operator is selected from a set comprising a first response to wait, a second response to proceed, and a third response that includes a trajectory.

19. The apparatus of claim 13, wherein the instructions further comprise instructions to:
identify another exception situation;
initiate another request for assistance from the tele-operator in response to the another exception situation; and
revoke the another request to the tele-operator.

20. The apparatus of claim 19, wherein to revoke the another request to the tele-operator comprises:
in response to determining that the another exception situation is cleared before receiving a response to the another request, revoke the another request to the tele-operator.

* * * * *